United States Patent
Aoki et al.

(10) Patent No.: US 8,954,384 B2
(45) Date of Patent: Feb. 10, 2015

(54) FILE STORAGE SYSTEM AND FILE STORAGE METHOD

(75) Inventors: Hironori Aoki, Tokyo (JP); Hirokazu Ogasawara, Odawara (JP); Yoshihiro Kataoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 13/560,385

(22) Filed: Jul. 27, 2012

(65) Prior Publication Data

US 2013/0325914 A1    Dec. 5, 2013

(30) Foreign Application Priority Data

Jun. 4, 2012 (JP) ................................ 2012-127418

(51) Int. Cl.
*G06F 7/00* (2006.01)
*G06F 17/00* (2006.01)

(52) U.S. Cl.
USPC ........................................................ 707/610

(58) Field of Classification Search
None
See application file for complete search history.

(56) References Cited

U.S. PATENT DOCUMENTS

| 2004/0255048 A1* | 12/2004 | Lev Ran et al. ................ 709/249 |
| 2009/0006794 A1 | 1/2009 | Mizuta et al. |
| 2009/0094236 A1* | 4/2009 | Renkes et al. ..................... 707/6 |
| 2009/0172079 A1* | 7/2009 | Eggleston et al. ............ 709/202 |

FOREIGN PATENT DOCUMENTS

JP    2009-009333 A    1/2009

* cited by examiner

*Primary Examiner* — Jason Liao
(74) *Attorney, Agent, or Firm* — Foley & Lardner LLP

(57) ABSTRACT

The file storage system of the present invention comprises a first server including a first file system (FS), and a second server including a second FS. The first and second servers respectively store first and second difference management tables. Upon receiving a write request, the first server stores a difference of a first file in the first FS, updates the first difference management table, and sends, to the second server, a difference storage notification showing that the difference of the first file has been stored in the first FS. The second server receives the difference storage notification, and updates the second difference management table.

11 Claims, 24 Drawing Sheets

Fig. 5

| File name | Difference file hold flag |
|---|---|
| File A | File server A |
| File B | File server B |
| File C | Null |
| File D | File server AB |
| File E | Delete |
| ... | ... |

| Difference ID (T201) | File name (T202) | File block path (T203) | Difference block path (T204) | Difference block hold flag (T205) |
|---|---|---|---|---|
| 001 | File A | ¥¥filesystem¥001 | ¥¥sabun¥001 | File server A |
| 002 | File A | ¥¥filesystem¥002 | ¥¥sabun¥002 | Null |
| 003 | File A | ¥¥filesystem¥003 | ¥¥sabun¥003 | Null |
| ... | ... | ... | ... | ... |
| 011 | File B | ¥¥filesystem¥011 | ¥¥sabun¥011 | Null |
| 012 | File B | ¥¥filesystem¥012 | ¥¥sabun¥012 | File server B |
| 013 | File B | ¥¥filesystem¥013 | ¥¥sabun¥013 | File server AB |
| ... | ... | ... | ... | ... |
| 023 | File C | ¥¥filesystem¥023 | ¥¥sabun¥023 | Null |
| 024 | File C | ¥¥filesystem¥024 | ¥¥sabun¥024 | Null |
| 025 | File C | ¥¥filesystem¥025 | ¥¥sabun¥025 | Null |
| ... | ... | ... | ... | ... |
| 040 | File D | ¥¥filesystem¥040 | ¥¥sabun¥040 | File server AB |
| 041 | File D | ¥¥filesystem¥041 | ¥¥sabun¥041 | Null |
| 042 | File D | ¥¥filesystem¥042 | ¥¥sabun¥042 | File server AB |
| ... | ... | ... | ... | ... |
| 121 | File E | ¥¥filesystem¥121 | ¥¥sabun¥121 | Null |
| 122 | File E | ¥¥filesystem¥122 | ¥¥sabun¥122 | Null |
| 123 | File E | ¥¥filesystem¥123 | ¥¥sabun¥123 | Null |
| ... | ... | ... | ... | ... |

| File name | Lock flag | Lock user |
|---|---|---|
| File A | Y | Client A |
| File B | N | Null |
| File C | Y | System |
| File D | Y | Client B |
| File E | Y | Failure |
| ... | ... | ... |

T301, T302, T303

T300

FILE STORAGE SYSTEM AND FILE STORAGE METHOD

CROSS-REFERENCE TO PRIOR APPLICATION

This application relates to and claims the benefit of priority from Japanese Patent Application No. 2012-127418 filed on Jun. 4, 2012, the entire disclosure of which is incorporated herein by reference.

BACKGROUND OF THE INVENTION

The present invention relates to the storage of files in a file storage system which has a first server including a first file system, and a second server including a second file system.

In recent years, a storage cloud in which files are transferred from a client installed in the respective bases or business divisions to a file server installed in a data center via the internet connection, and controlled centrally in the data center is becoming popular. With this storage cloud, from the perspective of data protection, remote copy of data in the file server is performed. As a system configuration for performing the remote copy of data in the file server, generally adopted is a system configuration including a file server which is accessed by a client during normal operation (hereinafter referred to as the "primary site"), and a file server which is the remote copy destination of the primary site and which is accessed by a client when a failure occurs in the primary site (hereinafter referred to as the "secondary site"). Normally, the primary site and the secondary site are installed at different data centers. In the foregoing system configuration, the secondary site is normally operated in an inaccessible state or in a state which allows Read Only access (hereinafter referred to as the "RO access"). If the secondary site is operated in a state which allows Read/Write access (access which enables Read and Write, and this is hereinafter referred to as the "RW access"), in a low-speed communication environment which connects the client and the data center via internet connection, the client can select the file server of the site having the optimal communication quality as the access destination in consideration of the physical distance to the data center.

As conventional technology related to remote copy between the primary site and the secondary site, disclosed is a configuration of performing asynchronous remote copy from the primary site to the secondary site, managing the difference bit in the primary site, and additionally managing the difference bit in the secondary site (for instance, Japanese Patent Application Publication No. 2009-9333). With the system disclosed in Japanese Patent Application Publication No. 2009-9333, when an access to the secondary site occurs, the difference bit of the primary site and the difference bit of the secondary site are compared to identify the data which has not been sent to the secondary site, the identified data is sent from the primary site to the secondary site, the secondary site is promoted to the primary site, the primary site is changed to the secondary site, and the client thereafter starts its access to the secondary site that was promoted to the primary site. Accordingly, the client can also perform the RW access to the secondary site.

SUMMARY

Nevertheless, with the technology disclosed in Japanese Patent Application Publication No. 2009-9333, in order to enable the RW access from the client to the primary site and the secondary site at all times, it is necessary to compare the difference bits and transfer data from the primary site to the secondary site each time the secondary site is accessed. Thus, there is a possibility that the access performance of the RW access will considerably deteriorate.

The file storage system has a first server including a first file system, and a second server including a second file system. The first server (for instance, storage device of the first server) stores a first difference management table which shows a file system that stores a difference of a first file stored in the first file system and the second file system. The second server (for instance, storage device of the second server) stores a second difference management table which shows a file system that stores the difference of the first file. Upon receiving a write request for writing data in the first file, the first server (for instance, control device of the first server) stores, in the first file system, difference data of the first file based on the write request, stores, in the first difference management table, data showing that the difference data of the first file is stored in the first file system, and sends, to the second server, a difference storage notification showing that the difference data of the first file has been stored in the first file system. Upon receiving the difference storage notification from the first server, the second server (for instance, control device of the second server) stores, in the second difference management table, data showing that the difference of the first file is stored in the first file system.

BRIEF DESCRIPTION OF THE DRAWINGS

FIG. 5 is a configuration diagram showing an example of the difference file management table according to Embodiment 1;

FIG. 6 is a configuration diagram showing an example of the difference block management table according to Embodiment 1;

FIG. 7 is a configuration diagram showing an example of the lock file management table according to Embodiment 1;

DESCRIPTION OF THE EMBODIMENTS

Figure 1:
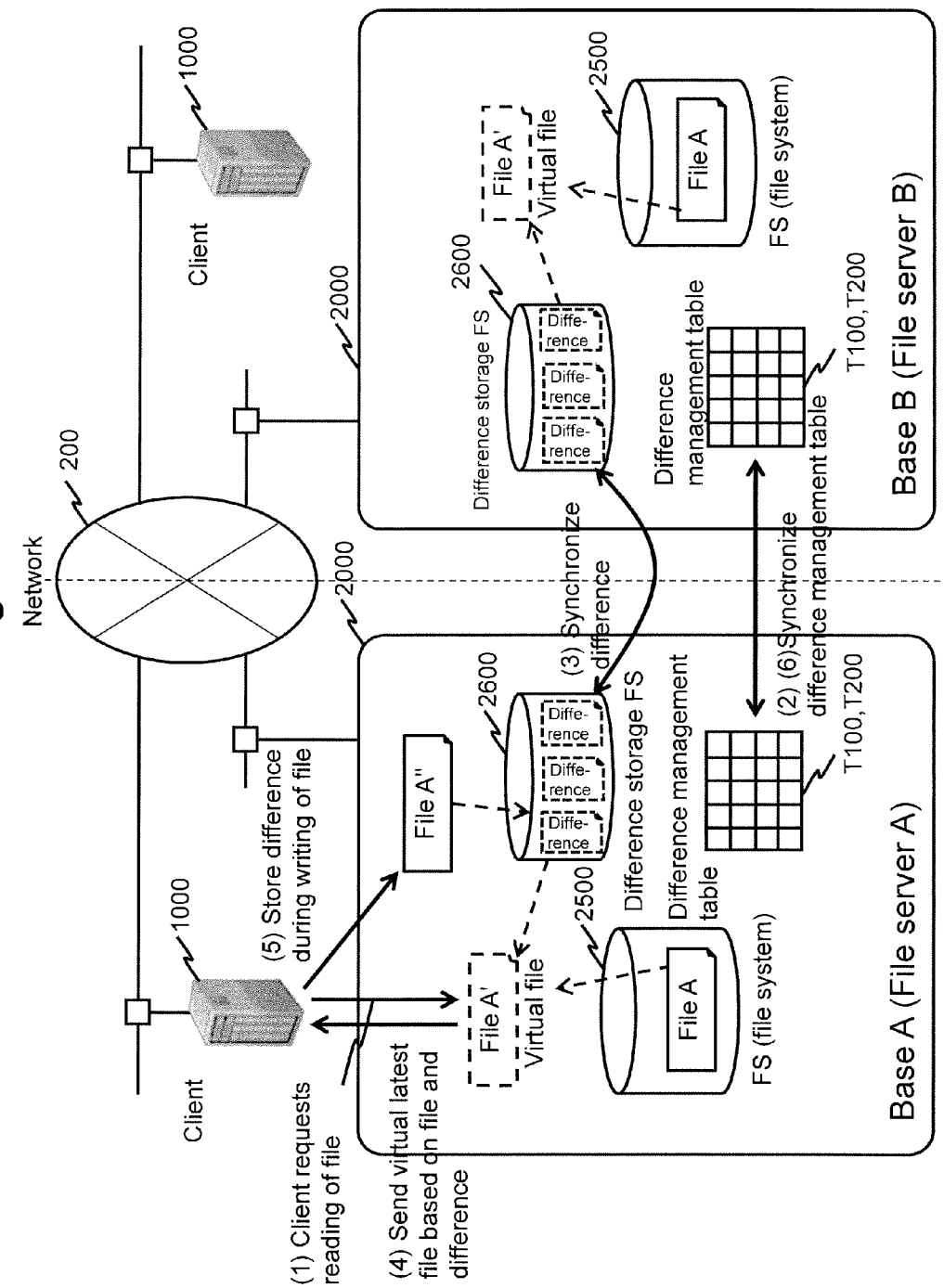
FIG. 1 is a diagram explaining the outline of Embodiment 1.

Several embodiments are now explained with reference to the drawings. Note that the ensuing embodiments do not limit the invention pertaining to the scope of claims, and the various elements and their combinations explained in the embodiments are not all necessarily essential for the solution of the present invention. The same reference numeral throughout the multiple drawings shows the same constituent element.

Note that, in the ensuing explanation, information is sometimes explained in the form of "aaa table" or the like, but such information may also be expressed according to a data structure other than a table, a list, a DB, a queue or the like. Thus, in order to show that the information is not dependent on a data structure, "aaa table" or the like is sometimes referred to as "aaa information".

Moreover, while "identifying information", "identifier", "name", "appellation", "ID" and other expressions are used upon explaining the subject matter of each piece of information, these expressions are mutually interchangeable.

Moreover, in the ensuing explanation, there are cases where the explanation is made with the term "program" as the subject. However, since a program performs predetermined processing by using a memory and a communication port as a result of being executed by a processor, the explanation may also be made by taking the term "processor" as the subject. Moreover, the processing that is disclosed by using the term "program" as the subject may also be processing to be performed by a computer such as a server. Moreover, a part of or the entire program may be realized with dedicated hardware. Moreover, the various programs may be installed in the respective computers via a program distribution server or a computer-readable storage medium.

Embodiment 1

FIG. 1 is a diagram explaining the outline of Embodiment 1.

A file server A and a file server B are a pair of file servers 2000 of a relationship where remote copy is mutually performed. The file server A and the file server B respectively include a difference management table (for instance, difference file management table 1100 and difference block management table 1200) showing in which difference storage file system 2600 of the file server 2000 a difference of a file stored in a file system (FS) 2500 of the file server A and a file system 2500 of the file server B is stored. When the file server A receives a read request from a client for reading data from a file A ((1) in the diagram), the file server A synchronizes with the file server B regarding the contents of an entry related to the file A in the difference management table and the difference of the file A in the difference storage file system 2600 ((2) and (3) in the diagram), and updates the entry related to the file A in the difference management table and the difference of the file A in the difference storage file system 2600. Thereafter, a virtual file A; that is, a file A which reflects the difference, is created from the file A and the difference of the file A, and the created virtual file A is sent to the client A ((4) in the diagram). Moreover, when the file server A receives a write request from the client A for writing data into the file A, the file server A stores the difference of the file A based on the write request in the difference storage file system 2600, updates the entry related to the file A in the difference management table by synchronizing that entry with the file server B ((5) in the diagram). Moreover, when the file server B receives a read request or a write request from a client for reading data from or writing data into the file A, the same processing as the foregoing file server A is performed in the file server B. Accordingly, the file server A and the file server B respectively include the difference management table, and the RW access can be made to both the file server A and the file server B by synchronizing the content of the difference management tables and the difference of the files between the file server A and the file server B.

Figure 2:
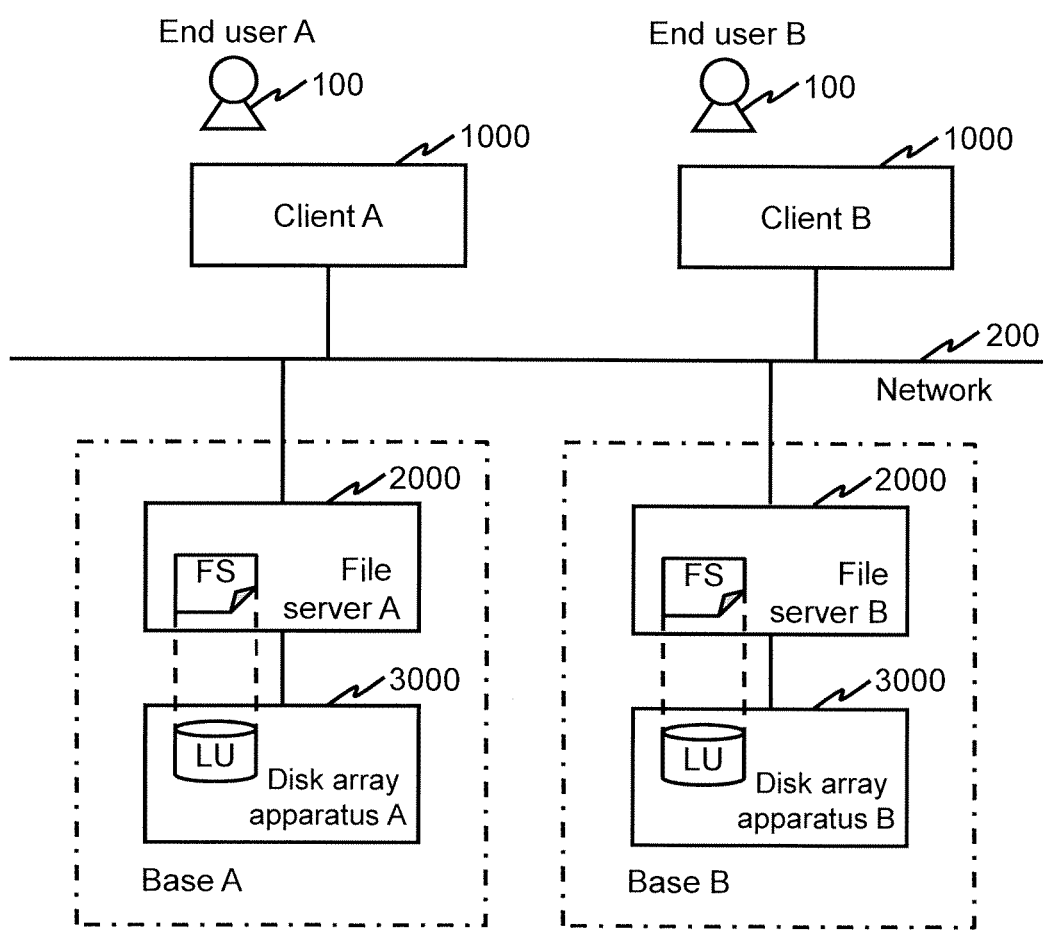
FIG. 2 is a configuration diagram showing an example of the computer system according to Embodiment 1.

FIG. 2 is a configuration diagram showing an example of the computer system according to Embodiment 1.

A computer system includes a network 200, two clients 1000 (client A and client B), two file servers 2000 (file server A and file server B), and two disk array apparatuses 3000 (disk array apparatus A and disk array apparatus B). The client 1000 and the file server 2000 are connected via the network 200. The file server 2000 is connected to the disk array apparatus 3000 which provides a storage area to the file server 2000. In this embodiment, the file server A is connected to the disk array apparatus A which provides a storage area to the file server A, and the file server B is connected to the disk array apparatus B which provides a storage area to the file server B. The file server A and the file server B are a pair of file servers 2000 of a relationship in which remote copy is mutually performed. The file server A and the disk array apparatus A are disposed in a base A, and the file server B and the disk array apparatus B are disposed in a base B.

The client 1000 and the file server 2000 are connected, for instance, via a wide area network (WAN). The file server 2000 and the disk array apparatus 3000 may be connected, for instance, via a storage area network (SAN), or directly connected via a dedicated line. Moreover, the file server 2000 and the disk array apparatus 3000 may also be a single device such as a network attached storage (NAS) having the functions of both devices.

Figure 3:
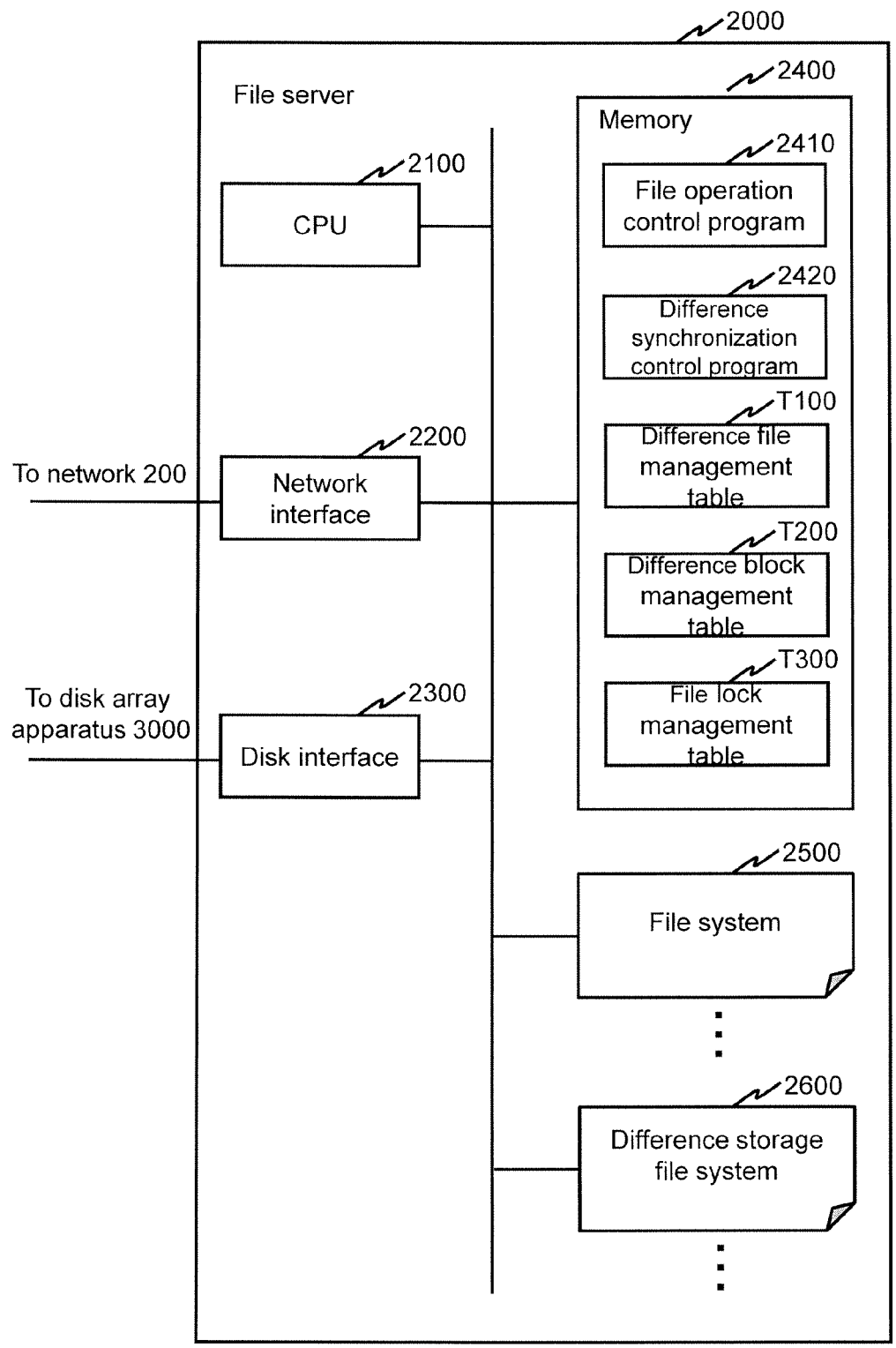
FIG. 3 is a configuration diagram showing an example of the file server according to Embodiment 1.

FIG. 3 is a configuration diagram showing an example of the file server according to Embodiment 1.

The file server 2000 includes a CPU 2100, a network interface 2200, a disk interface 2300, a memory 2400, a file system 2500, a difference storage file system 2600, and an internal communication path (for instance, a bus) for connecting the foregoing components.

The CPU 2100 executes programs stored in the memory 2400. The network interface 2200 is a device for communicating with other file servers 2000 and clients 1000 via the network 200. The disk interface 2300 is a device for communicating with the disk array apparatus 3000.

The file system 2500 and the difference storage file system 2600 are storage areas based on a disk drive 3300 of the disk array apparatus 3000 mounted on the file server 2000 via the disk interface 2300. The file system 2500 is an area for storing the files to be accessed by the client 1000. The difference storage file system 2600 is an area for storing the difference of the files to be accessed by the client 1000.

The memory 2400 stores programs and tables. Specifically, the memory 2400 stores a file operation control program 2410, a difference synchronization control program 2420, a difference file management table T100, a difference block management table T200, and a file lock management table T300. The difference file management table T100 and the difference block management table T200 are information (difference management tables) showing in which difference storage file system 2600 of the file server 2000 the difference of the file is stored. The file operation control program 2410 is a program for managing the difference file management table T100, the difference block management table T200, and the file lock management table T300, and controlling the I/O of the files to and from the file system 2500 and the I/O of the difference of files to and from the difference storage file system 2600 in file block units of a predetermined size. The difference synchronization control program 2420 is a program for managing the difference file management table T100, the difference block management table T200, and the file lock management table T300, and synchronizing the files, the difference of the files, the difference file management table T100 and the difference block management table T200 between the file servers 2000.

Figure 4:
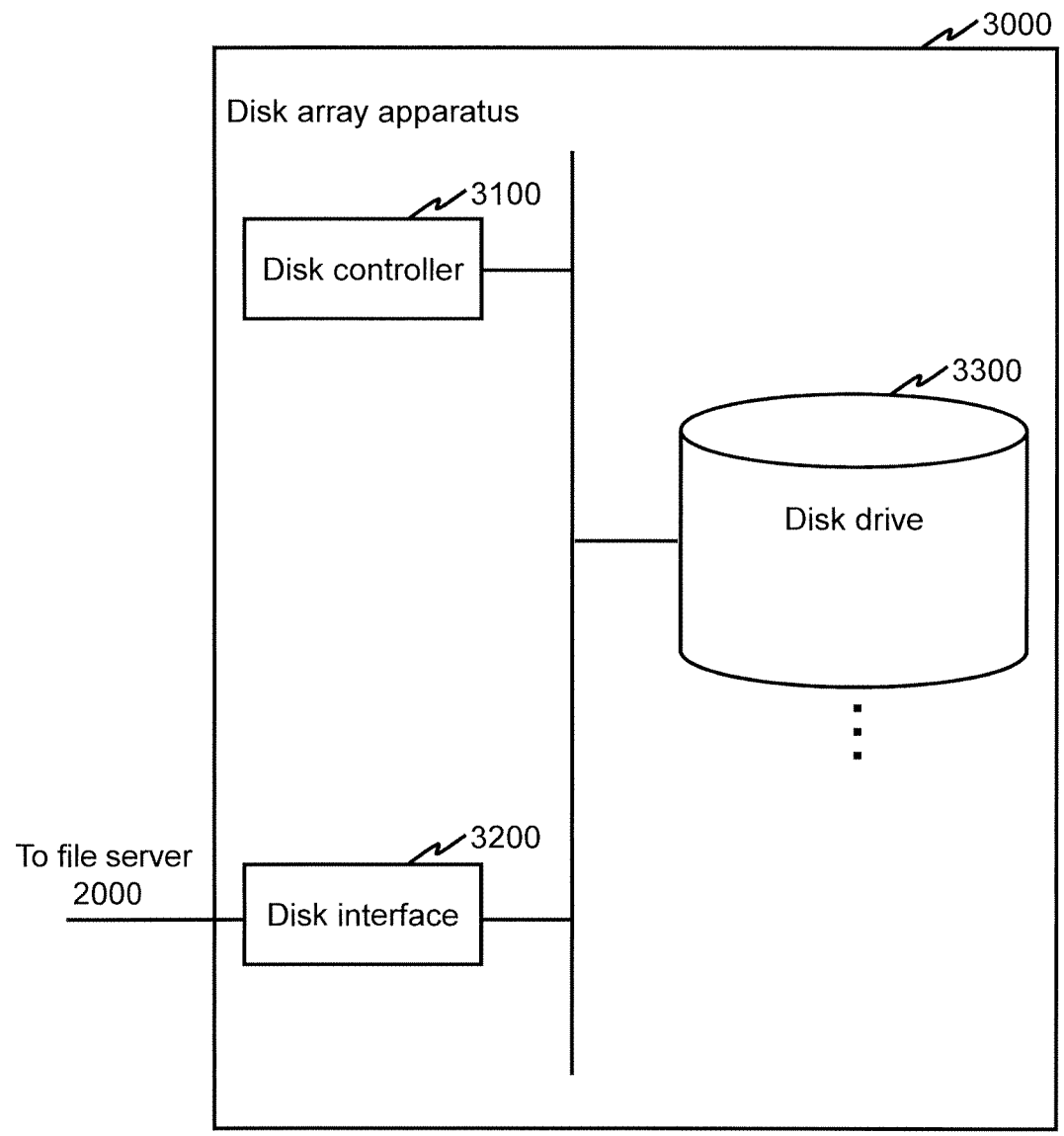
FIG. 4 is a configuration diagram showing an example of the disk array apparatus according to Embodiment 1.

FIG. 4 is a configuration diagram showing an example of the disk array apparatus according to Embodiment 1.

The disk array apparatus 3000 includes a disk controller 3100, a disk interface 3200, a disk drive 3300, and an internal communication path (for instance, a bus) for connecting the foregoing components.

The disk controller 3100 receives an I/O request (read request or write request) from the file server 2000 via the disk interface 3200. In addition, the disk controller 3100 inputs and outputs the corresponding data in the disk drive 3300 in, for instance, block units based on the foregoing I/O request.

The disk interface 3200 is a device for communicating with the file server 2000.

The disk drive 3300 is a storage device which provides a storage area for storing data. The disk drive 3300 is mounted on the file server 2000 as the file system 2500 or the difference storage file system 2600. In this embodiment, the disk drive 3300 of the disk array apparatus A is mounted on the file server A, and the disk drive 3300 of the disk array apparatus B is mounted on the file server B.

FIG. 5 is a configuration diagram showing an example of the difference file management table according to Embodiment 1.

The difference file management table T100 manages, for each file stored in the file system 2500 of the file server 2000, data (difference retention information) showing in which difference storage file system 2600 of the file server 2000 the difference of that file is stored. The difference file management table T100 is created by the file server 2000.

The difference file management table T100 includes fields of a file name T101, and a difference file hold flag T102. The file name T101 stores information; for instance, a file name, for identifying the file. The difference file hold flag T102 stores data; for example, "Null", showing the non-existence of the difference of a file when that difference of the file does not exist, and stores data; for example, the name of the file server 2000, showing the file server 2000 storing the latest difference when that difference of the file does exist. In this embodiment, "file server A" is stored in the difference file hold flag T102 when the latest difference of the file is stored in the file server A, "file server B" is stored when the latest difference of the file is stored in the file server B, "file server AB" is stored when the latest difference of the file is stored in the file server A and the file server B, and "Null" is stored when the difference of the file does not exist. As a result of the difference file management table T100 managing data showing the file server 2000 that stores the latest difference of the respective files, it is possible to determine whether the transfer of the difference is required in file units. Moreover, the contents of the respective difference file management tables T100 are synchronized between the file server A and the file server B.

FIG. 6 is a configuration diagram showing an example of the difference block management table according to Embodiment 1.

The difference block management table T200 manages data showing in which difference storage file system 2600 of the file server 2000 the difference of the file is stored in file block units. The difference block management table T200 is created by the file server 2000.

The difference block management table T200 includes the fields of a difference ID T201, a file name T202, a file block path T203, a difference block path T204, and a difference block hold flag T205. The difference ID T201 stores an identifier which is uniquely assigned to the respective entries of the difference block management table T200. The file name T202 stores information; for instance, a file name, for identifying the file. The file block path T203 stores information; for instance, path information, for identifying the storage area in the file system 2500 regarding the file blocks configuring the file. The difference block path T204 stores information; for instance, path information, for identifying the storage area in the difference storage file system 2600 regarding the difference block as the latest difference of the file blocks configuring the file. The difference block hold flag T205 stores data; for instance, "Null", showing the non-existence of a difference block when a difference block does not exist, and stores data; for instance, a name of the file server 2000, showing the file server 2000 in which a difference block is stored when a difference block exists. In this embodiment, "file server A" is stored in the difference block hold flag T205 when the difference block is stored in the file server A, "file server B" is stored when the difference block is stored in the file server B, "file server AB" is stored when the difference block is stored in the file server A and the file server B, and "Null" is stored when a difference block does not exist. As a result of the difference block management table T200 managing the path information to the storage area of the file blocks configuring the respective files, the path information to the storage areas of the difference block as the latest difference of the file blocks, and data showing the file server 2000 that stores the difference block, it is possible to determine whether it is necessary to transfer the difference in file block units regarding the file in which the transfer of the difference was deemed necessary. Moreover, the contents of the respective difference block management tables T200 are synchronized between the file server A and the file server B.

FIG. 7 is a configuration diagram showing an example of the lock file management table according to Embodiment 1.

The file lock management table T300 manages information (lock information) showing whether the file is locked. The file lock management table T300 is created by the file server 2000.

The file lock management table T300 includes the fields of a file name T301, a lock flag T302, and a lock user T303. The file name T301 stores information; for instance, a file name, for identifying the file. The lock flag T302 stores lock information of the file. The lock flag T302 stores data (for instance, "Y") showing that the lock of the file has been acquired in such a case, and data (for instance, "N") showing that the lock of the file has not been acquired in such a case. The lock user T303 stores information; for instance, a user name, showing the user who acquired the lock of the file. Moreover, the contents of the respective file lock management tables T300 are synchronized between the file server A and the file server B.

The operation of the file servers 2000 (file server A and file server B) according to this embodiment is now explained. In the ensuing explanation, the difference file management table T100 of the file server A is indicated as "difference file management table T100A", and the difference file management table T100 of the file server B is indicated as "difference file management table T100B". Moreover, the difference block management table T200 of the file server A is indicated as "difference block management table T200A", and the difference block management table T200 of the file server B is indicated as "difference block management table T200B". Moreover, the file lock management table T300 of the file server A is indicated as "file lock management table T300A", and the file lock management table T300 of the file server B is indicated as "file lock management table T300B".

Figure 8:
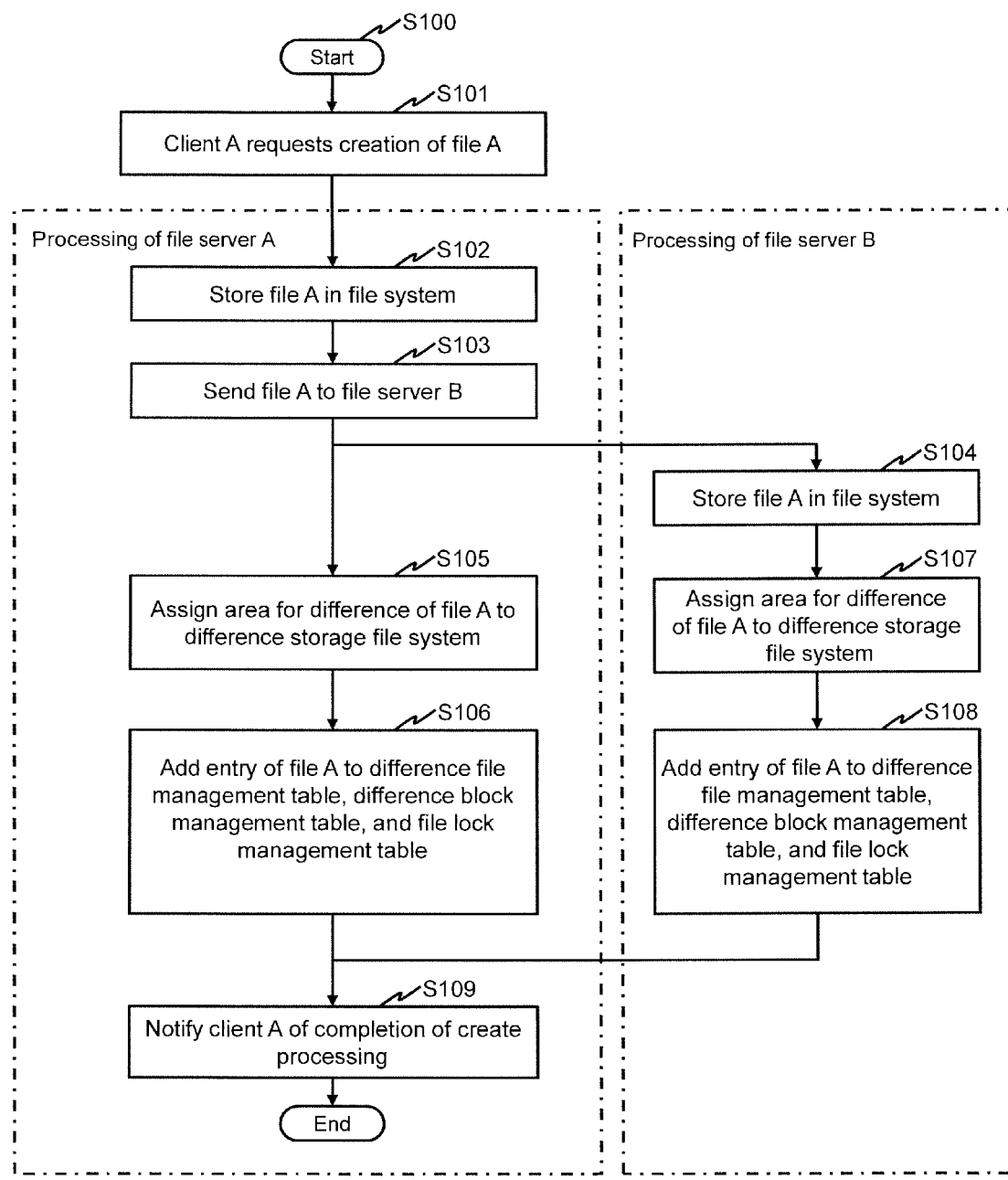
FIG. 8 is a flowchart of the file create processing according to Embodiment 1.

FIG. 8 is a flowchart of the file create processing according to Embodiment 1. This diagram show a case where the client A requests the creation of the file A to the file server A.

Foremost, the client A operated by the end user 100 issues a create request of the file A to the file server A, and sends the file A together with the create request (step S101).

Subsequently, the file operation control program 2410 of the file server A receives the create request and the file A, and stores the received file A in the file system 2500 of the file server A (step S102). As a result of the file operation control program 2410 of the file server A storing the file A in the file system 2500 of the file server A, the file A is written in the disk drive 3300; that is, the disk drive 3300 of the disk array apparatus A, mounted on the file server A.

Subsequently, the file operation control program 2410 of the file server A sends, to the file server B, the file A that was stored in the file system 2500 in step S102 (step S103).

The file operation control program 2410 of the file server B that received the file A stores the received file A in the file system 2500 of the file server B (step S104). As a result of the file operation control program 2410 of the file server B storing the file A in the file system 2500 of the file server B, the file A is written in the disk drive 3300; that is, the disk drive 3300 of the disk array apparatus B, mounted on the file server B.

After sending the file A to the file server B, the file operation control program 2410 of the file server A assigns, to the difference storage file system 2600 of the file server A, an area for storing the difference of the file A stored in the file system 2500 in step S103 (step S105). Accordingly, as a result of assigning an area for storing the difference of the file A upon creating the file A, there is no need to assign a storage area for the difference each time the RW access is made, and the access performance of the RW access can be improved.

Subsequently, the file operation control program 2410 of the file server A adds entry related to the file A to the difference file management table T100A. Specifically, the file operation control program 2410 of the file server A newly adds entry in which "file A" is stored in the file name T101 and "Null" is stored in the difference file hold flag T102. Moreover, the file operation control program 2410 of the file server A adds entries related to the file A to the difference block management table T200A. Specifically, the file operation control program 2410 of the file server A adds entries in which a unique numerical value is stored in the difference ID T201, "file A" is stored in the file name T202, a path to the storage area of the file block configuring the file A in the file system 2500 of the file server A is stored in the file block path T203, a path to the storage area of the difference block (difference block of the file blocks configuring the file A) of the file A in the difference storage file system 2600 of the file server A is stored in the difference block path T204, and "Null" is stored in the difference block hold flag T205. The addition of entries to the difference block management table T200A is performed to all file blocks configuring the file A. Moreover, the file operation control program 2410 of the file server A adds entry related to the file A to the file lock management table T300A. Specifically, the file operation control program 2410 of the file server A adds entry in which "file A" is stored in the file name T301, "N" is stored in the lock flag T302, and "Null" is stored in the lock user T303 (step S106).

Meanwhile, after storing the file A in the file system 2500 of the file server B, the file operation control program 2410 of the file server B performs the same processing as step S105 and step S106 in the file server B. In other words, the file operation control program 2410 of the file server B assigns an area for storing the difference of the file A to the difference storage file system 2600 of the file server B (step S107). Thereafter, the file operation control program 2410 of the file server B adds entries related to the file A to the difference file management table T100B. Specifically, the file operation control program 2410 of the file server B adds entries in which "file A" is stored in the file name T101, and "Null" is stored in the difference file hold flag T102. Moreover, the file operation control program 2410 of the file server B adds entries related to the file A to the difference block management table T200B. Specifically, the file operation control program 2410 of the file server B adds entries in which a unique numerical value is stored in the difference ID T201, "file A" is stored in the file name T202, a path to the storage area of the file block configuring the file A in the file system 2500 of the file server B is stored in the file block path T203, a path to the storage area of the difference block of the file A in the difference storage file system 2600 of the file server B is stored in the difference block path T204, and "Null" is stored in the difference block hold flag T205. The addition of entries to the difference block management table T200B is performed to all file blocks configuring the file A. Moreover, the file operation control program 2410 of the file server B adds entries related to the file A to the file lock management table T300B. Specifically, the file operation control program 2410 of the file server B adds entries in which "file A" is stored in the file name T301, "N" is stored in the lock flag T302, and "Null" is stored in the lock user T303 (step S108).

After completing the processing of step S106, the file operation control program 2410 of the file server A notifies the client A of the completion of the creation of the file A (step S109), and ends the file create processing.

Figure 9:
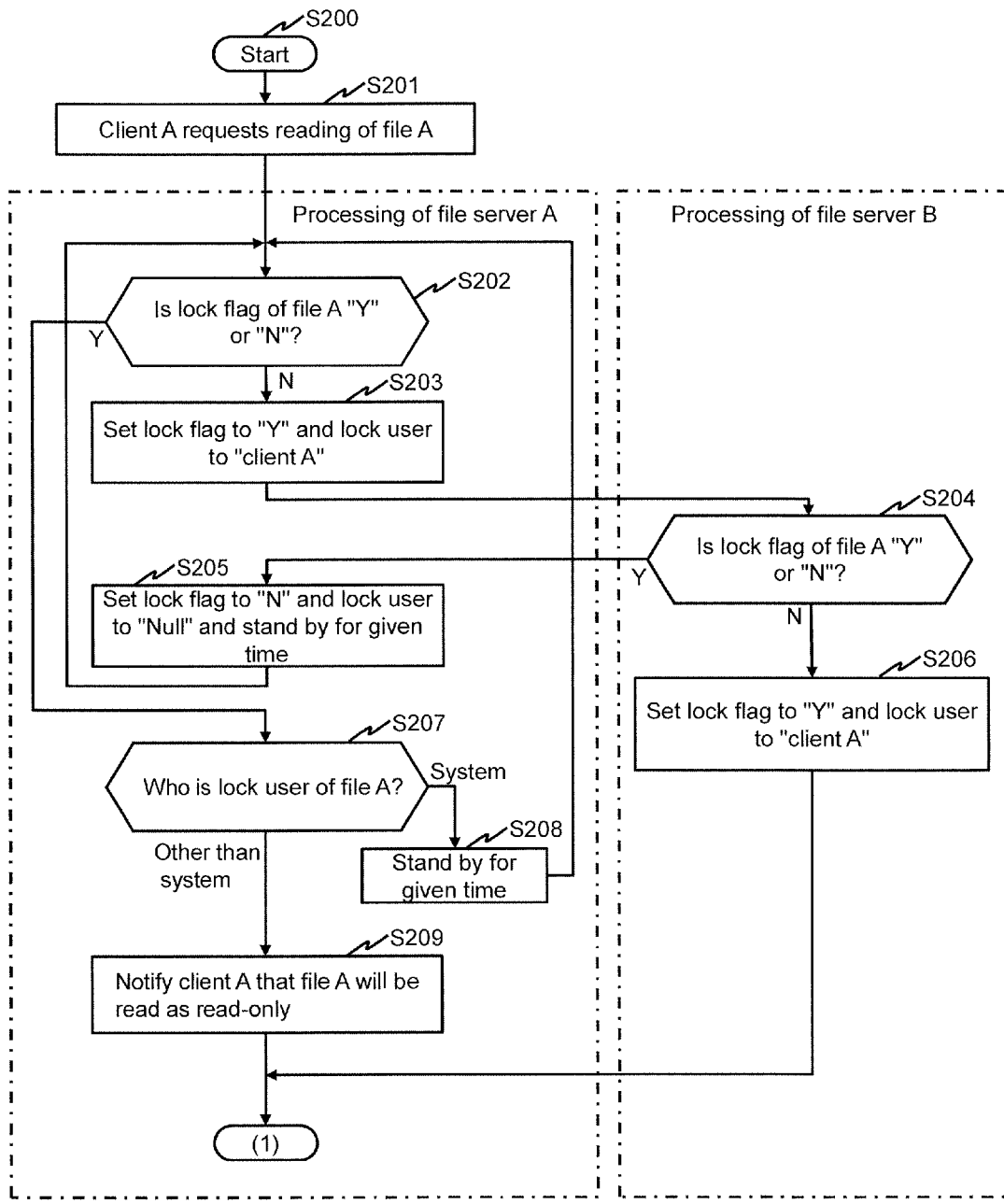
FIG. 9 is a first flowchart of the file read processing according to Embodiment 1.
Figure 10:
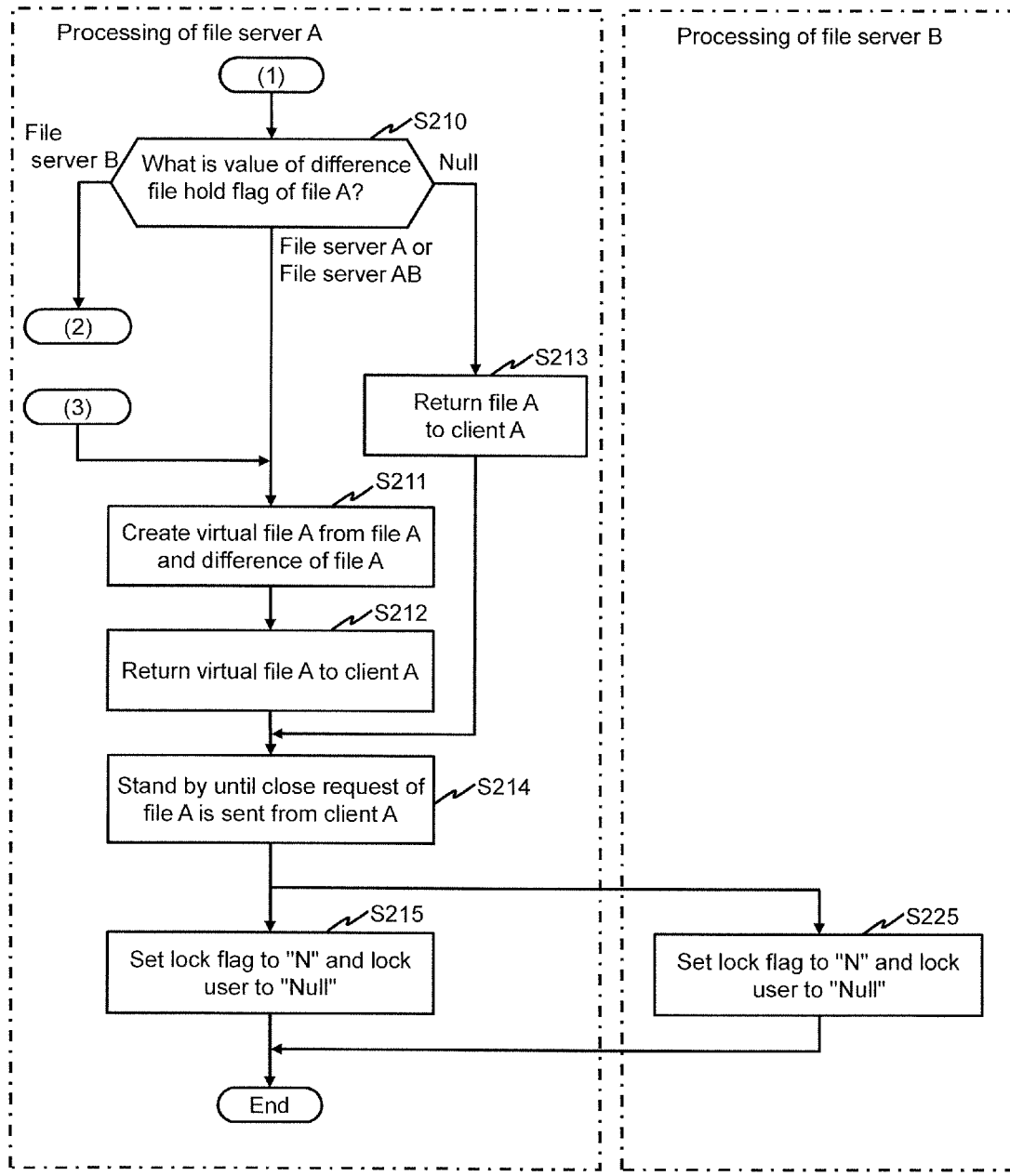
FIG. 10 is a second flowchart of the file read processing according to Embodiment 1.
Figure 11:
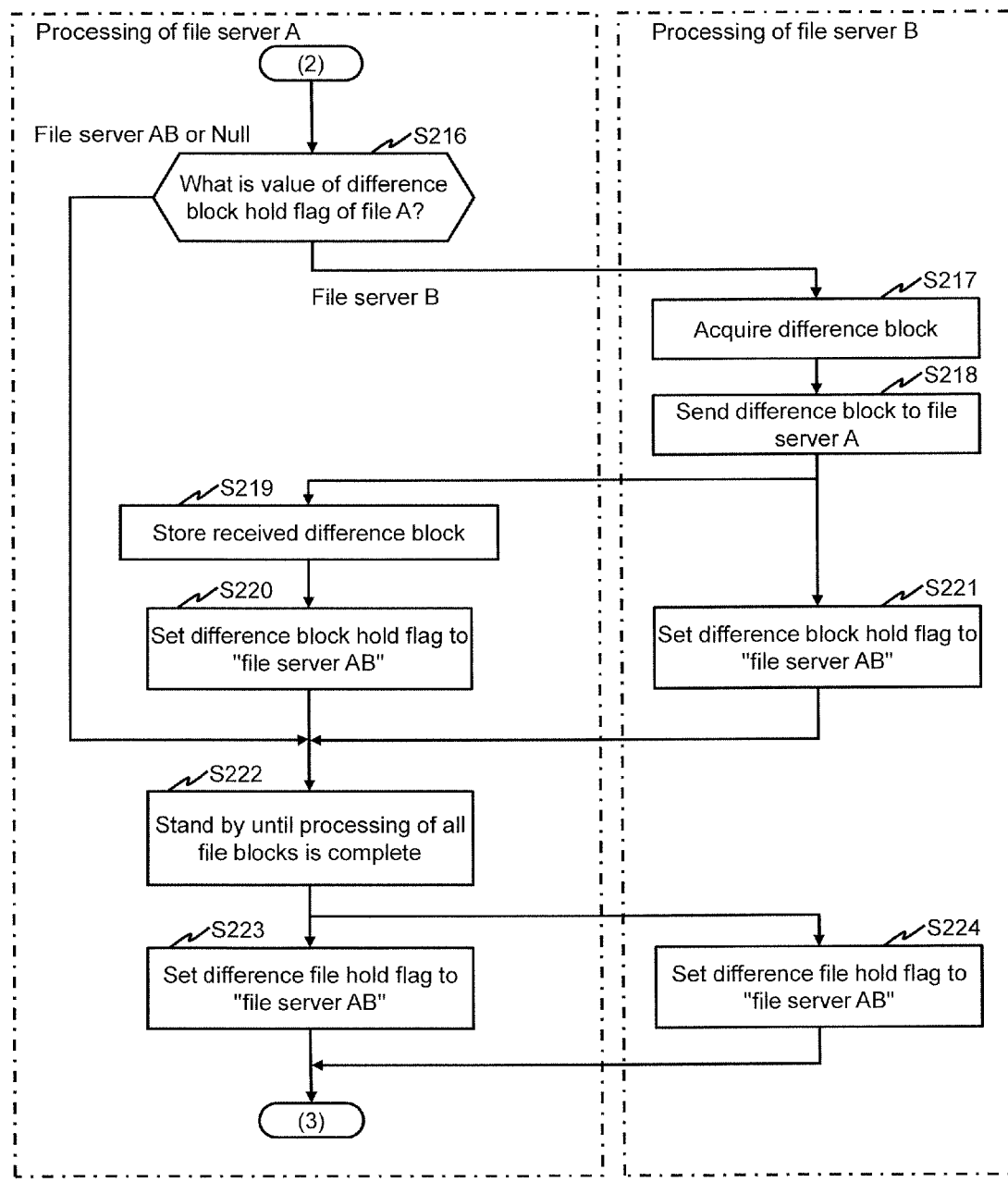
FIG. 11 is a third flowchart of the file read processing according to Embodiment 1.

FIG. 9 is a first flowchart of the file read processing according to Embodiment 1. FIG. 10 is a second flowchart of the file read processing according to Embodiment 1. FIG. 11 is a third flowchart of the file read processing according to Embodiment 1. The three flowcharts shown in FIG. 9 to FIG. 11 show the overall file read processing, (1), (2) and (3) in these diagrams show the connection of the flowcharts in the respective diagrams, and the portion of the same indication in the drawings show that the processing is continuous. FIG. 9 to FIG. 11 show a case where the client A requests the reading of the file A to the file server A.

In FIG. 9, foremost, the client A operated by the end user 100 issues a read request of the file A to the file server A (step S201).

Upon receiving the read request of the file A from the client A, the file operation control program 2410 of the file server A refers to the file lock management table T300A, determines whether the lock flag T302 of the entry related to the file A; that is, whether the lock flag T302 of the entry in which the file name T301 is "file A" is "Y" or "N", and then branches the processing (step S202). Specifically, the file operation control program 2410 of the file server A advances the processing to step S203 when the lock flag T302 is "N" (step S202: N), and advances the processing to step S207 when the lock flag T302 is "Y" (step S202: Y).

The processing that is executed when the lock flag T302 is "N" in the determination in step S202 (step S202: N) is described below. The file operation control program 2410 of the file server A sets the lock flag T302 of the entry related to the file A in the file lock management table T300A to "Y", and sets the lock user T303 to "client A" (step S203). In addition, the file operation control program 2410 of the file server A notifies the file operation control program 2410 of the file server B, of the acquisition of lock of the file A.

The file operation control program 2410 of the file server B that received the notification regarding the acquisition of lock of the file A refers to the file lock management table T300B, determines whether the lock flag T302 of the entry in which the file name T301 is "file A" is "Y" or "N", and then branches the processing (step S204). Specifically, the file operation control program 2410 of the file server B notifies the file server A that the file A has already been locked when the lock flag 1302 is "Y" (step S204: Y), and advances the processing to step S206 when the lock flag T302 is "N" (step S204: N).

The file operation control program 2410 of the file server A that received the notification from the file server B to the effect that the file A has already been locked sets, in step S205, the lock flag T302 of the entry related to the file A in the file lock management table T300A to "N", sets the lock user T303 to "Null", and advances the processing to step S202 after waiting a given time.

Meanwhile, the processing that is executed when the lock flag T302 is "N" in the determination in step S204 (step S204: N) is described below. The file operation control program 2410 of the file server B sets the lock flag T302 of the entry related to the file A in the file lock management table T300B to "Y", and sets the lock user T303 to "client A" (step S206), and notifies the file server A that the lock of the file A has been acquired. Note that the file operation control program 2410 of the file server A that received the notification from the file server B to the effect that the lock of the file A has been acquired advances the processing to step S210 of FIG. 10.

The processing that is executed when the lock flag T302 is "Y" in the determination in step S202 (step S202: Y) is described below. The file operation control program 2410 of the file server A refers to the file lock management table T300A, determines the user indicated by the lock user T303 of the entry in which the file name T301 is "file A"; that is, determines the user who has acquired the lock of the file A, and then branches the processing (step S207). Specifically, the file operation control program 2410 of the file server A advances the processing to step S208 when the lock user T303 is "system"; that is, when the system has acquired the lock of the file A (step S207: system), and advances the processing to step S209 when the lock user T303 is other than "system"; that is, when a user other than the system acquired the lock of the file A (step S207: other than system).

The processing that is executed when the lock user T303 is "system" (step S207: system) in the determination in step S207 is described below. The file operation control program 2410 of the file server A waits for a given time (step S208), and thereafter advances the processing to step S202.

The processing that is executed when the lock user T303 is other than "system" (step S207: other than system) in the determination in step S207 is described below. Since the file A has been locked by another user, the file operation control program 2410 of the file server A notifies the client A that the file A will be read only (step S209), and thereafter advances the processing to step S210 of FIG. 10.

In step S210 of FIG. 10, the file operation control program 2410 of the file server A refers to the difference file management table T100A, determines the value of the difference file hold flag T102 of the entry (entry related to file A) in which the file name T101 is "file A", and then branches the processing (step S210). Specifically, the file operation control program 2410 of the file server A advances the processing to step S216 of FIG. 11 when the difference file hold flag T102 is "file server B"; that is, when the latest difference of the file A is stored in the file server B (step S210: file server B), advances the processing to step S211 when the difference file hold flag T102 is "file server A" or "file server AB"; that is, when the latest difference of the file A is stored in the file server A (step S210: file server A or file server AB), and advances the processing to step S213 when the difference file hold flag T102 is "Null"; that is, when there is no difference of the file A (step S210: Null).

The processing that is executed when the difference file hold flag T102 is "file server A" or "file server AB" in the determination in step S210 (step S210: file server A or file server AB) is described below. The file operation control program 2410 of the file server A refers to the respective difference block hold flags T205 of the entries (entries related to file A) in which the file name T202 is "file A" in the difference block management table T200A, and identifies whether there is a difference block regarding the respective file blocks configuring the file A. In addition, regarding the file block in which the difference block hold flag T205 is "Null"; that is, regarding the file block without a difference block, the file operation control program 2410 of the file server A acquires that file block from the area that is identified by the path information shown with the file block path T203 in the file system 2500 of the file server A. Meanwhile, regarding the file block in which the difference block hold flag T205 is other than "Null"; that is, regarding the file block with a difference block, the file operation control program 2410 of the file server A acquires the difference block of that file block from the area that is identified by the path information shown with the difference block path T204 in the difference storage file system 2600 of the file server A. Thereafter, the file operation control program 2410 of the file server A creates a virtual file A; that is, the file A with the latest difference reflected therein, in the memory 2400 based on the acquired file block and the difference block (step S211).

Subsequently, the file operation control program 2410 of the file server A sends the virtual file A that was created in step S211 to the client A (step S212), and advances the processing to step S214.

The processing that is executed when the difference file hold flag T102 is "Null" in the determination in step S210 (step S210: Null) is described below. The file operation control program 2410 of the file server A acquires the path information for identifying the storage area of the respective file blocks configuring the file A from the respective file block paths T203 of the entries in which the file name T202 is "file A" in the difference block management table T200A. In addition, the file operation control program 2410 of the file server A acquires the respective file blocks configuring the file A from the area that was identified by the acquired path information in the file system 2500 of the file server A. Thereafter, the file operation control program 2410 of the file server A creates the file A in the memory 2400 based on the acquired file blocks. Thereafter, the file operation control program 2410 of the file server A sends the created file A to the client A (step S213), and advances the processing to step S214.

In step S214, the file operation control program 2410 of the file server A waits until a close request of the file A from the client A is received.

Upon receiving a close request of the file A from the client A, the file operation control program 2410 of the file server A notifies the file server B of the reception of the close request of the file A, sets the lock flag of the entry in which the file name T301 is "file A" in the file lock management table T300A to "N", and sets the lock user to "Null" (step S215). Thereafter, the file operation control program 2410 of the file server A ends the file read processing.

The file operation control program 2410 of the file server B that received the notification from the file server A regarding the reception of the close request of the file A sets the lock flag of the entry in which the file name T301 is "file A" in the file lock management table T300B to "N", and sets the lock user to "Null" (step S225). Thereafter, the file operation control program 2410 of the file server B ends the file read processing.

Moreover, the processing that is executed when the difference file hold flag T102 is the "file server B" in the determination in step S210 (step S210: file server B) is described below. The file operation control program 2410 of the file server A performs the processing in the file server A among step S216 to step S221 of FIG. 11 to the respective file blocks configuring the file A. Note that the processing of step S216 to step S221 may be performed by the file operation control program 2410 of the file server A to the respective file blocks successively or in parallel. Here, one file block to be processed among the file blocks configuring the file A is referred to as a "target file block" in the explanation of step S216 to step S221. The file operation control program 2410 of the file server A refers to the difference block hold flag T205 of the entry related to the target file block in the difference block management table T200A, determines whether there is a difference block of the target file block and determines the file server 2000 that stores the difference block of the target file block when there is a difference block, and then branches the processing (step S216). Specifically, the file operation control program 2410 of the file server A notifies the file server B of the value of the difference ID T201 of the entry related to the target file block when the difference block hold flag T205 is "file server B"; that is, when a difference block exists and that difference block is stored in the file server B (step S216: file server B). Meanwhile, the file operation control program 2410 of the file server A advances the processing to step S222 when the difference block hold flag T205 is "file server AB" or "Null"; that is, when a difference block does not exist or is stored in the file server A (step S216: file server AB or Null).

The file operation control program 2410 of the file server B that received the notification of the value of the difference ID T201 of the entry related to the target file block from the file server A advances the processing to step S217. In step S217, the file operation control program 2410 of the file server B identifies the entry related to the target file block in the difference block management table T200B based on the notified value of the difference ID T201. In addition, the file operation control program 2410 of the file server B acquires the difference block of the target file block from the area that was identified by the path information shown with the difference block path T204 of the identified entry (step S217).

Subsequently, the file operation control program 2410 of the file server B sends the difference block acquired in step S217, together with the value of the difference ID 1201, to the file server A (step S218).

The file operation control program 2410 of the file server A that received the difference block of the target file block from the file server B stores, by way of overwriting, the received difference block in the area that is identified by the path information shown with the difference block path T204 of the entry related to the target file block in the difference storage file system 2600 of the file server A (step S219). As a result of the file operation control program 2410 of the file server A storing the difference block in the difference storage file system 2600 of the file server A, the difference block is written in the disk drive 3300 mounted on the file server A; that is, the disk drive 3300 of the disk array apparatus A.

Subsequently, the file operation control program 2410 of the file server A sets the difference block hold flag T205 of the entry related to the target file block in the difference block management table T200A to "file server AB" (step S220).

Meanwhile, after sending the difference block of the target file block (after step S218), the file operation control program 2410 of the file server B sets the difference block hold flag T205 of the entry related to the target file block in the difference block management table T200B to "file server AB" (step S221).

The file operation control program 2410 of the file server A waits until the processing of step S216 to step S221 regarding the respective file blocks configuring the file A is complete (step S222), and, after the processing regarding the respective file blocks configuring the file A is complete, notifies the file server B of the completion of the acquisition of the difference block.

Subsequently, the file operation control program 2410 of the file server A sets the difference file hold flag T103 of the entry in which the file name T101 is "file A" in the difference file management table T100A to "file server AB" (step S223). Thereafter, the file operation control program 2410 of the file server A advances the processing to step S211 of FIG. 10.

Meanwhile, upon receiving the notification from the file server A regarding the completion of the acquisition of the difference block, the file operation control program 2410 of the file server B sets the difference file hold flag T103 of the entry in which the file name T101 is "file A" in the difference file management table T100B to "file server AB" (step S224).

Figure 12:
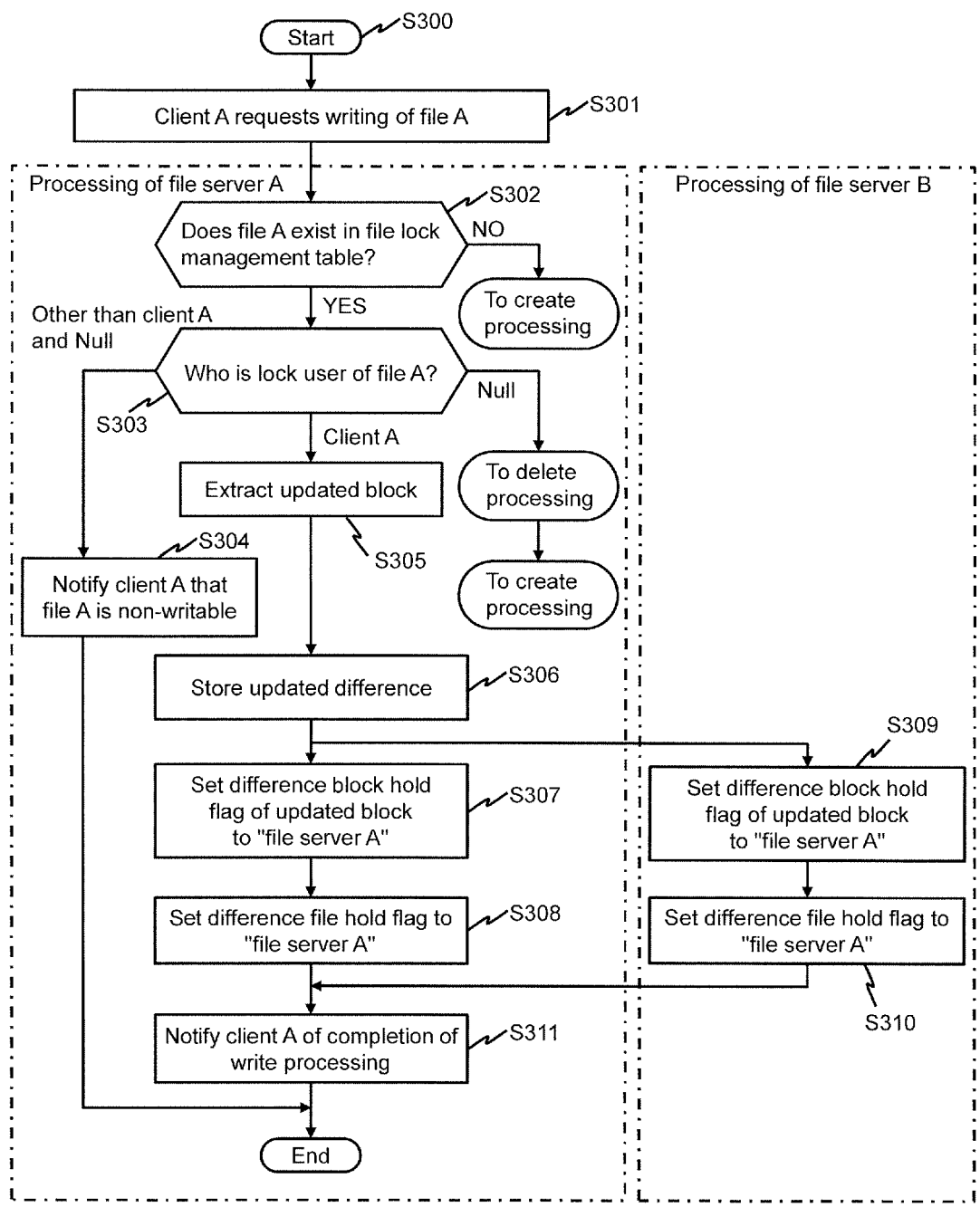
FIG. 12 is a flowchart of the file write processing according to Embodiment 1.

FIG. 12 is a flowchart of the file write processing according to Embodiment 1. This diagram shows a case where the client A requests the writing of the file A to the file server A. Note that, let it be assumed that the file read processing of FIG. 9 to FIG. 11 has been performed prior to the performance of the file write processing of this diagram.

Foremost, the client A operated by the end user 100 issues a write request of the file A to the file server A, and sends the updated file A together with the write request (step S301).

Subsequently, the file operation control program 2410 of the file server A refers to the file lock management table T300A, determines whether there is an entry in which the file name T301 is "file A", and then branches the processing (step S302). Specifically, the file operation control program 2410 of the file server A advances the processing to step S303 when there is an entry in which the file name T301 is "file A" (step S302: YES), and performs the file create processing (refer to FIG. 8) of the file A when there is no entry in which the file name T301 is "file A" (step S302: NO).

The processing that is executed when there is an entry in which the file name T301 is "file A" in the determination in step S302 (step S302: YES) is described below. The file operation control program 2410 of the file server A refers to the file lock management table T300A, determines the user shown with the lock user T303 of the entry in which the file name T301 is "file A", and then branches the processing (step S303). Specifically, the file operation control program 2410 of the file server A advances the processing to step S305 when the lock user T303 is "client A" (step S303: client A), and determines that this is processing for overwriting a separate file of the same name when the lock user T303 is "Null" (step S303: Null), performs the file delete processing of the file A (refer to FIG. 13), and thereafter performs the file create processing of the file A (refer to FIG. 8). Moreover, the file operation control program 2410 of the file server A advances the processing to step S304 when the lock user T303 is neither "client A" nor "Null" (step S303: other than client A and Null).

The processing that is executed when the lock user T303 is neither "client A" nor "Null" in the determining step S303 (step S303: other than client A and Null) is described below. The file operation control program 2410 of the file server A notifies the client A that the file A has been locked by another user and is therefore read only and writing is not possible (step S304), and thereby ends the file write processing.

The processing that is executed when the lock user T303 is "client A" in the determination in step S303 (step S303: client A) is described below. The file operation control program 2410 of the file server A compares the respective file blocks configuring the file A received from the client A in step S301, and the respective file blocks configuring the file A sent to the client A in step S212 or step S213 of FIG. 10; that is, the respective file blocks configuring the file A sent to the client in the file read processing that was performed prior to the file write processing, and extracts the updated file blocks (hereinafter referred to as the "updated blocks") of the file A (step S305).

Subsequently, the file operation control program 2410 of the file server A acquires, from the difference block management table T200A, the path information shown with the difference block path T204 of the entry related to the updated blocks. In addition, the file operation control program 2410 of the file server A stores, as the difference blocks, the updated data of the updated bocks in the area that is identified by the acquired path information in the difference storage file system 2600 of the file server A (step S306), and notifies the file server B of the completion of the storage of the difference blocks.

Subsequently, the file operation control program 2410 of the file server A sets the difference block hold flag T205 of the entry related to the updated blocks in the difference block management table T200A to "file server A" (step S307).

Subsequently, the file operation control program 2410 of the file server A sets the difference file hold flag T102 of the entry in which the file name T101 is "file A" in the difference file management table T100A to "file server A" (step S308), and advances the processing to step S311.

Meanwhile, upon receiving a notification from the file server A regarding the completion of storage of the difference blocks, the file operation control program 2410 of the file server B performs the same processing as step S307 and step S308. In other words, the file operation control program 2410 of the file server B sets the difference block hold flag T205 of the entry related to the updated blocks in the difference block management table T200B to "file server A" (step S309). Moreover, the file operation control program 2410 of the file server B sets the difference file hold flag T102 of the entry in which the file name T101 is "file A" in the difference file management table T100B to "file server A" (step S310).

In step S311, the file operation control program 2410 of the file server A notifies the client A of the completion of writing of the file A (step S311), and thereby ends the file write processing.

Figure 13:
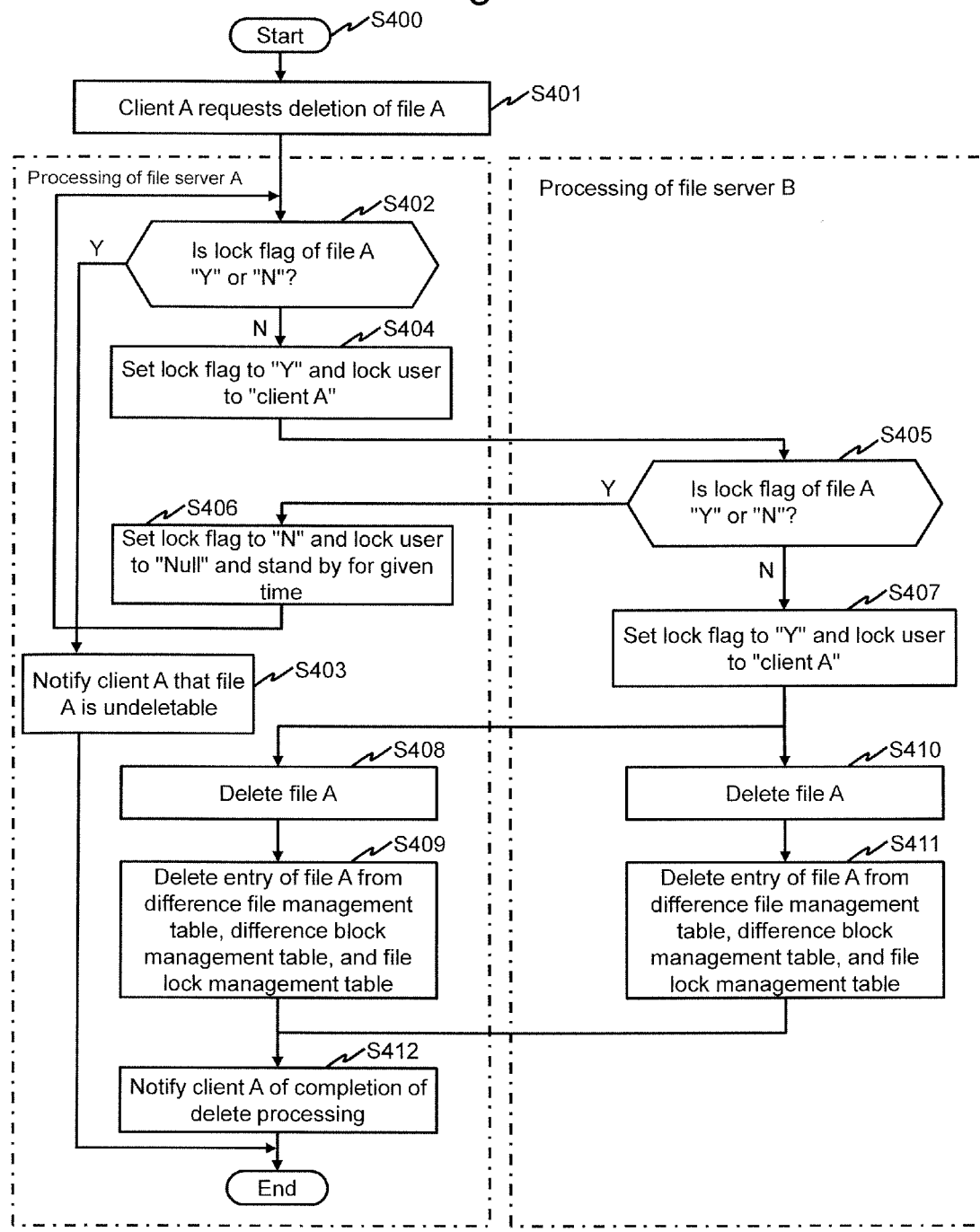
FIG. 13 is a flowchart of the file delete processing according to Embodiment 1.

FIG. 13 is a flowchart of the file delete processing according to Embodiment 1. This diagram shows a case where the client A requests the deletion of the file A to the file server A.

Foremost, the client A operated by the end user 100 issues a delete request of the file A to the file server A (step S401).

Subsequently, the file operation control program 2410 of the file server A refers to file lock management table T300A, determines whether the lock flag T302 of the entry in which the file name T301 is "file A" is "Y" or "N", and then branches the processing (step S402). Specifically, the file operation control program 2410 of the file server A advances the processing to step S403 when the lock flag T302 is "Y" (step S402: Y), and advances the processing to step S404 when the lock flag T302 is "N" (step S402: N).

The processing that is executed when the lock flag T302 is "Y" in the determination in step S402 (step S402: Y) is described below. The file operation control program 2410 of the file server A notifies the client A that the file A has been locked by another user and is in a read only state and cannot be deleted (step S403), and thereby ends the file delete processing.

The processing that is executed when the lock flag T302 is "N" in the determination in step S402 (step S402: N) is described below. The file operation control program 2410 of the file server A sets the lock flag T302 of the entry in which the file name T301 is "file A" in the file lock management table T300A to "Y", and sets the lock user T303 to "client A" (step S404). In addition, the file operation control program 2410 of the file server A notifies the file operation control program 2410 of the file server B, of the acquisition of lock of the file A.

Upon receiving the notification regarding the acquisition of lock of the file A from the file server A, the file operation control program 2410 of the file server B refers to the file lock management table T300B, determines whether the lock flag T302 of the entry in which the file name T301 is "file A" is "Y" or "N", and then branches the processing (step S405). Specifically, the file operation control program 2410 of the file server B notifies the file server A that the lock of the file A has already been acquired by another user when the lock flag T302 is "Y" (step S405: Y). Meanwhile, the file operation control program 2410 of the file server B advances the processing to step S407 when the lock flag T302 is "N" (step S405: N). Upon receiving the notification from the file server B to the effect that the file A is locked, the file operation control program 2410 of the file server A advances the processing to step S406.

In step S406, the file operation control program 2410 of the file server A sets the lock flag T302 of the entry in which the file name T301 is "file A" in the file lock management table T300A to "N", sets the lock user T303 to "Null", waits for a given time, and thereafter advances the processing to step S402.

Meanwhile, the processing that is executed when the lock flag T302 is "N" in the determination in step S405 (step S405: N) is described below. The file operation control program 2410 of the file server B sets the lock flag T302 of the entry in which the file name T301 is "file A" in the file lock management table T300B to "Y", sets the lock user T303 to "client A" (step S407), and notifies the file server A that the lock of the file A has been acquired.

Upon receiving the notification from the file server B to the effect that the lock of the file A has been acquired, the file operation control program 2410 of the file server A deletes, in step S408, all file blocks stored in the area that is identified by the path information shown with the file block path T203 of the entry in which the file name T202 is "file A" in the difference block management table T200A; that is, all file blocks configuring the file A stored in the file system 2500 of the file server A. Moreover, the file operation control program 2410 of the file server A deletes all difference blocks stored in the area that is identified by the path information shown with the difference block path T204 of the entry in which the file name T202 is "file A" in the difference block management table T200A; that is, all difference blocks of the file A stored in the difference storage file system 2600 of the file server A.

Subsequently, the file operation control program 2410 of the file server A deletes all entries related to the file A registered in the difference file management table T100A, the difference block management table T200A and the file lock management table T300A, respectively (step S409), and advances the processing to step S412.

In the file server B, after completing the processing of step S407, in parallel with step S408 and step S409, the file operation control program 2410 of the file server B performs the same processing as step S408 and step S409 in the file server B. In other words, the file operation control program 2410 of the file server B deletes all file blocks stored in the area that is identified by the path information shown with the file block path T203 of the entry in which the file name T202 is "file A" in the difference block management table T200B; that is, all file blocks configuring the file A stored in the file system 2500 of the file server B. Moreover, the file operation control program 2410 of the file server B deletes all difference blocks stored in the area that is identified by the path information shown with the difference block path T204 of the entry in which the file name T202 is "file A" in the difference block management table T200B; that is, all difference blocks of the file A stored in the difference storage file system 2600 of the file server B (step S410). Thereafter, the file operation control program 2410 of the file server B deletes all entries related to the file A registered in the difference file management table T100B, the difference block management table T200B and the file lock management table T300B, respectively (step S411).

After completing the processing of step S409, the file operation control program 2410 of the file server A notifies the client A of the completion of deletion of the file A (step S412), and thereby ends the file delete processing.

Figure 14:
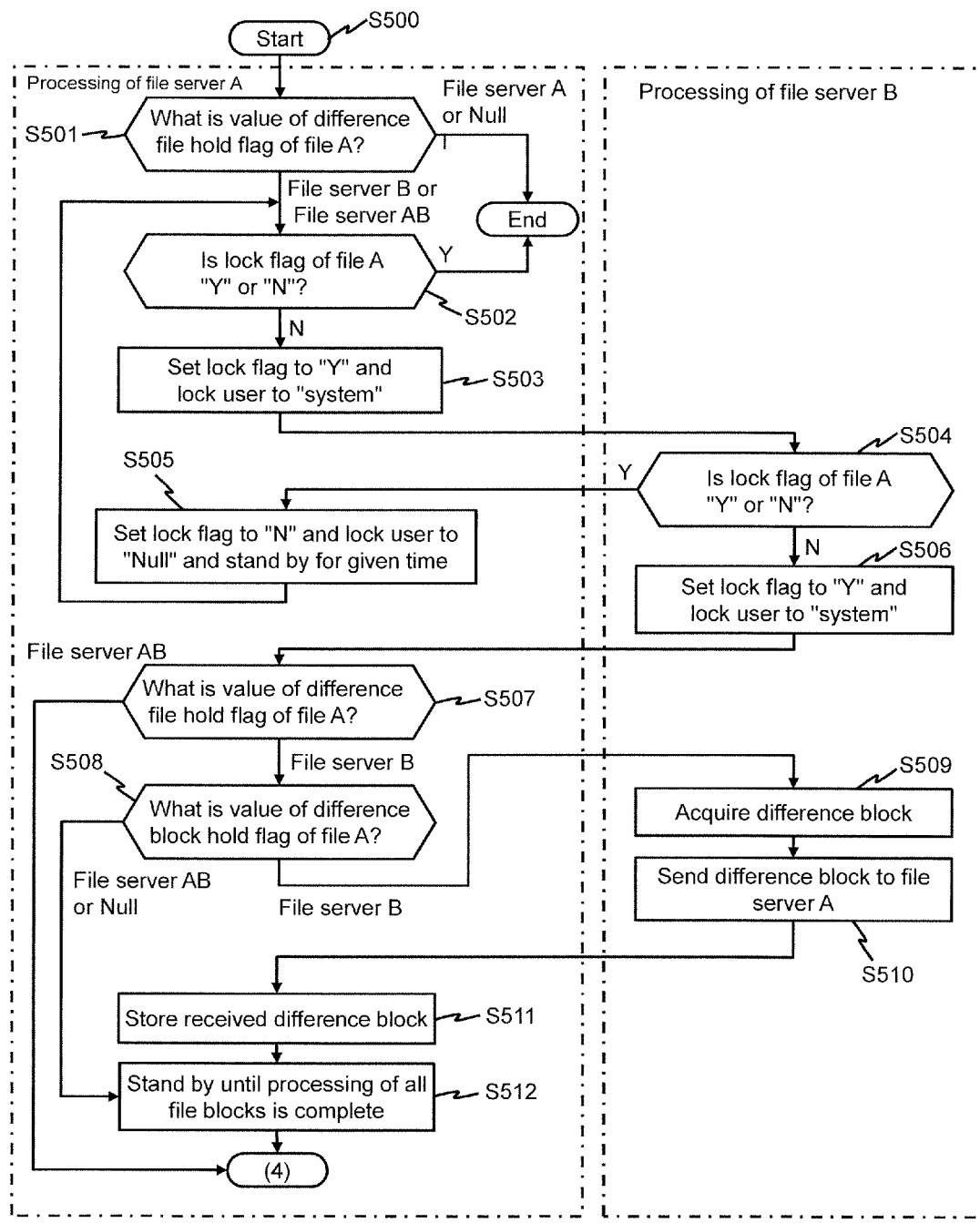
FIG. 14 is a first flowchart of the synchronous processing according to Embodiment 1.
Figure 15:
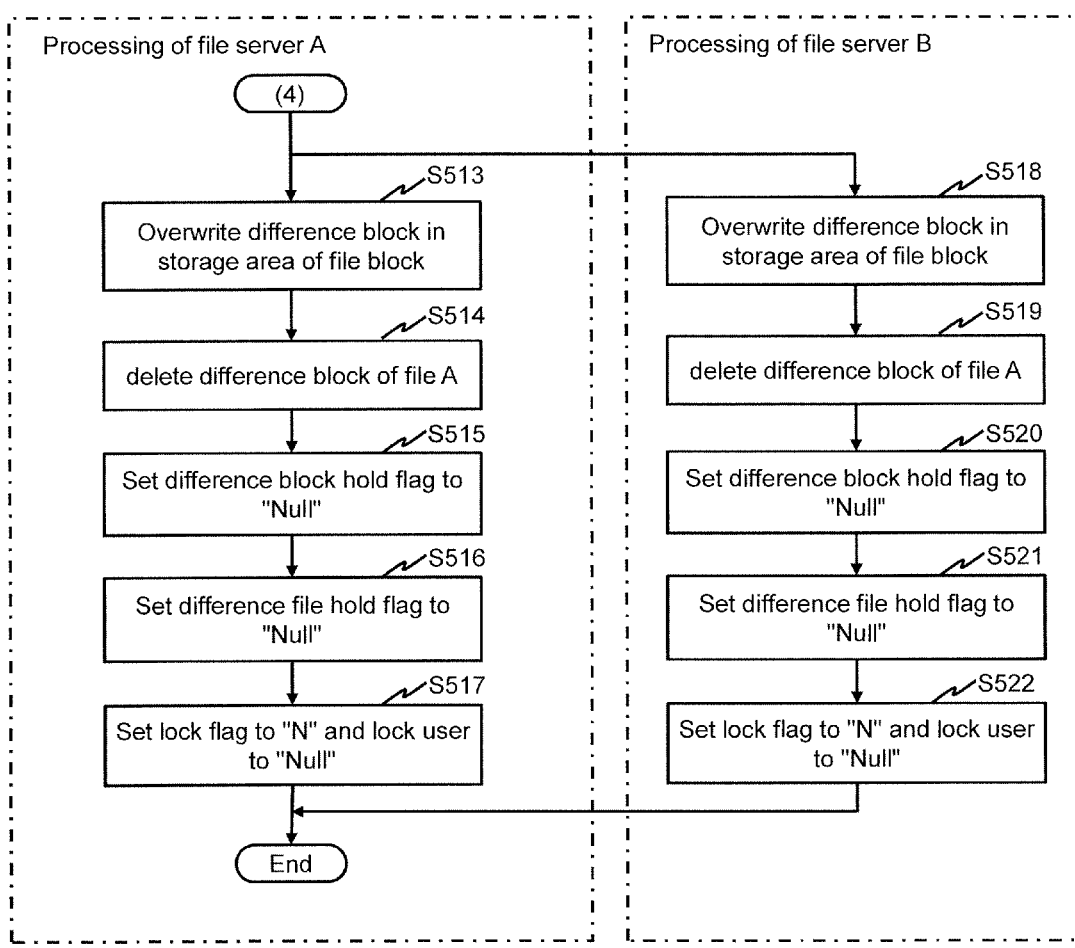
FIG. 15 is a second flowchart of the synchronous processing according to Embodiment 1.

FIG. 14 is a first flowchart of the synchronous processing according to Embodiment 1. FIG. 15 is a second flowchart of the synchronous processing according to Embodiment 1. The two flowcharts shown in FIG. 14 and FIG. 15 show the overall synchronous processing, and (4) in this diagram shows the connection of the flowcharts of the respective diagrams, and the portion of the same indication in the drawings show that the processing is continuous. FIG. 14 and FIG. 15 shows a case where the file A is stored in the file system 2500.

The synchronous processing is performed periodically or randomly. For example, the file server 2000 may confirm whether there is a file among the files stored in the file system 2500 in which synchronization seems possible, and perform the synchronous processing when there is a file in which synchronization seems possible. Specifically, for example, the file server 2000 may perform the synchronous processing when there is no access to the file for a given time or longer or when the difference of the file has accumulated in a given amount or more; that is, when the number of difference blocks stored in the difference storage file system 2600 is a given value or more. When operation is continued under circumstances where there are numerous files that have not been accessed for a given time or longer or numerous files in which the file difference has accumulated in a given amount or more, this will cause the increase in inconsistent files when a failure occurs in one of the bases (for example, the file server). Meanwhile, when the synchronous processing is performed when there is no access to the file for a given time or longer or when the difference of the file has accumulated in a given amount or more, it is expected that the incidence rate of inconsistent files can be inhibited during the occurrence of a failure. Moreover, the file server 2000 may also perform the synchronous processing based on a schedule which defines the date and time of starting the synchronous processing. The file server 2000 may also perform the synchronous processing regarding certain files among a plurality of files. For example, the file server 2000 may perform the synchronous processing only regarding the files that have not been accessed for a given time or longer or the file in which the difference has accumulated in a given amount or more.

In FIG. 14, foremost, the difference synchronization control program 2420 of the file server A refers to the difference file management table T100A, determines the value of the difference file hold flag T102 of the entry in which the file name T101 is "file A", and then branches the processing (step S501). Specifically, the difference synchronization control program 2420 of the file server A advances the processing to step S502 when the difference file hold flag T102 is "file server B" or "file server AB" (step S501: file server B or file server AB). Meanwhile, the difference synchronization control program 2420 of the file server A ends the synchronous processing when the difference file hold flag T102 is "file server A" or "Null" (step S501: file server A or Null).

The processing that is executed when the difference file hold flag T102 is "file server B" or "file server AB" in the determination in step S501 (step S501: file server B or file server AB) is described below. The difference synchronization control program 2420 of the file server A refers to the file lock management table T300A, determines whether the lock flag T302 of the entry in which the file name T301 is "file A" is "Y" or "N", and then branches the processing (step S502). Specifically, the difference synchronization control program 2420 of the file server A advances the processing to step S503 when the lock flag T302 is "N" (step S502: N), and ends the synchronous processing when the lock flag T302 is "Y" (step S502: Y).

The processing that is executed when the lock flag T302 is "N" in the determination in step S502 (step S502: N) is described below. The difference synchronization control program 2420 of the file server A sets the lock flag T302 of the entry in which the file name T301 is "file A" in the file lock management table T300A to "Y", and sets the lock user T303 to "system" (step S503). In addition, the difference synchronization control program 2420 of the file server A notifies the difference synchronization control program 2420 of the file server B of the acquisition of lock of the file A.

Upon receiving the notification regarding the acquisition of lock of the file A from the file server A, the difference synchronization control program 2420 of the file server B refers to the file lock management table T300B, determines whether the lock flag T302 of the entry in which the file name T301 is "file A" is "Y" or "N", and then branches the processing (step S504). Specifically, the difference synchronization control program 2420 of the file server B notifies the file server A that the lock of the file A has already been acquired by another user when the lock flag T302 is "Y" (step S504: Y), and advances the processing to step S506 when the lock flag T302 is "N" (step S504: N).

Upon receiving the notification from the file server B to the effect that the file A has already been locked, the difference synchronization control program 2420 of the file server A sets, in step S505, the lock flag T302 of the entry in which the file name T301 is "file A" in the file lock management table T300A is "N", sets the lock user T303 to "Null", waits for a given time, and thereafter advances the processing to step S502.

Meanwhile, the processing that is executed when the lock flag T302 is "N" in the determination in step S504 (step S504: N) is described below. The difference synchronization control program 2420 of the file server B sets the lock flag T302 of the entry in which the file name T301 is "file A" in the file lock management table T300B to "Y", sets the lock user T303 to "system" (step S506), and notifies the file server A that the lock of the file A has been acquired.

Upon receiving the notification from the file server B to the effect that the lock of the file A has been acquired, the difference synchronization control program 2420 of the file server A, in step S507, refers to the difference file management table T100A, determines the value of the difference file hold flag T102 of the entry in which the file name T101 is "file A", and then branches the processing (step S507). Specifically, the difference synchronization control program 2420 of the file server A advances the processing to step S508 when the difference file hold flag T102 is "file server B"; that is, when the latest difference of the file A is stored in the file server B (step S507: file server B), and notifies the file server B of the completion of synchronization of the difference blocks and advances the processing to step S513 of FIG. 15 when the difference file hold flag T102 is "file server AB"; that is, when the latest difference of the file A is stored in the file server A and the file server B (step S507: file server AB).

The processing that is executed when the difference file hold flag T102 is "file server B" in the determination in step S507 (step S507: file server B) is described below. The difference synchronization control program 2420 of the file server A performs the processing on the file server A side among the processing of step S508 to step S511 to the respective file blocks configuring the file A. Note that the processing of step S508 to step S511 may be performed to the respective file blocks successively or in parallel. Here, one file block to be processed among the file blocks configuring the file A is referred to as a "target file block" in the explanation of step S508 to step S511.

The difference synchronization control program 2420 of the file server A refers to the difference block hold flag T205 of the entry related to the target file block in the difference block management table T200A, determines whether there is a difference block of the target file block and determines the file server 2000 that stores the difference block of the target file block when there is a difference block, and then branches the processing (step S508). Specifically, the difference synchronization control program 2420 of the file server A notifies the file server B of the value of the difference ID T201 of the entry related to the target file block when the difference block hold flag T205 is "file server B"; that is, when a difference block exists and that difference block is stored in the file server B (step S508: file server B). Meanwhile, the difference synchronization control program 2420 of the file server A advances the processing to step S512 when the difference block hold flag T205 is "file server AB" or "Null"; that is, when a difference block does not exist or is stored in the file server A (step S508: file server AB or Null).

The difference synchronization control program 2420 of the file server B that received the notification of the value of the difference ID T201 of the entry related to the target file block from the file server A, in step S509, identifies the entry related to the target file block in the difference block management table T200B based on the notified value of the difference ID T201. In addition, the difference synchronization control program 2420 of the file server B acquires the difference block of the target file block from the area that is identified by the path information shown with the difference block path T204 of the identified entry (step S509).

Subsequently, the difference synchronization control program 2420 of the file server B sends the difference block acquired in step S509, together with the value of the difference ID T201, to the file server A (step S510).

The difference synchronization control program 2420 of the file server A that received the difference block of the target file block from the file server B stores, by way of overwriting, the received difference block in the area that is identified by the path information shown with the difference block path T204 of the entry related to the target file block in the difference storage file system 2600 of the file server A (step S511).

Subsequently, the difference synchronization control program 2420 of the file server A waits until the processing of step S508 to step S511 regarding the respective file blocks configuring the file A is complete (step S512), and, after the processing regarding the respective file blocks configuring the file A is complete, notifies the file server B of the completion of synchronization of the difference blocks, and advances the processing to step S513 of FIG. 15.

In step S513 of FIG. 15, the difference synchronization control program 2420 of the file server A refers to the difference block management table T200A, and identifies the file block shown with entries in which the file name T202 is "file A" and the difference block hold flag T205 is other than "Null"; that is, the file block in which a difference block exists. In addition, the difference synchronization control program 2420 of the file server A stores, by way of overwriting, the difference block of the identified file block, which is stored in the difference storage file system 2600 of the file server A, in the storage area of the identified file block in the file system 2500 of the file server A (step S513).

Subsequently, the difference synchronization control program 2420 of the file server A deletes the difference block stored in the area that is identified by the path information shown with the difference block path T204 of the entry in which the file name T202 is "file A" in the difference block management table T200A; that is, the difference block of the file A that is stored in the difference storage file system 2600 of the file server A (step S514).

Subsequently, the difference synchronization control program 2420 of the file server A sets the respective difference block hold flags T205 of the entry in which the file name T202 is "file A" in the difference block management table T200A to "Null" (step S515).

Subsequently, the difference synchronization control program 2420 of the file server A sets the difference file hold flag of the entry in which the file name T101 is "file A" in the difference file management table T100A to "Null" (step S516).

Subsequently, the difference synchronization control program 2420 of the file server A sets the lock flag T302 of the entry in which the file name T301 is "file A" in the file lock management table T300A to "N", and sets the lock user T303 to "Null" (step S517).

Meanwhile, the difference synchronization control program 2420 of the file server B that received the notification from the file server A regarding the completion of synchronization of the difference blocks, in parallel with step S513 to step S517, performs the same processing as step S513 to step S517 in the file server B. In other words, the difference synchronization control program 2420 of the file server B refers to the difference block management table T200B, and identifies the file block shown with entries in which the file name T202 is "file A" and the difference block hold flag T205 is other than "Null"; that is, the file block in which a difference block exists. In addition, the difference synchronization control program 2420 of the file server B stores, by way of overwriting, the difference block of the identified file block, which is stored in the difference storage file system 2600 of the file server B, in the storage area of the identified file block in the file system 2500 of the file server B (step S518). Subsequently, the difference synchronization control program 2420 of the file server B deletes the difference block stored in the area that is identified by the path information shown with the difference block path T204 of the entry in which the file name T202 is "file A" in the difference block management table T200B; that is, the difference block of the file A stored in the difference storage file system 2600 of the file server B (step S519). Subsequently, the difference synchronization control program 2420 of the file server B sets the respective difference block hold flags T205 of the entry in which the file name T202 is "file A" in the difference block management table T200B to "Null" (step S520). Subsequently, the difference synchronization control program 2420 of the file server B sets the difference file hold flag of the entry in which the file name T101 is "file A" in the difference file management table T100B to "Null" (step S521). Subsequently, the difference synchronization control program 2420 of the file server B sets the lock flag T302 of the entry in which the file name T301 is "file A" in the file lock management table T300B to "N", and sets the lock user T303 to "Null" (step S522).

After completing the processing of step S517, the difference synchronization control program 2420 of the file server A ends the synchronous processing.

With the synchronous processing in this embodiment, the file server 2000 transferred the difference block in step S510 and thereafter wrote the difference block in the difference storage file system 2600 over the file block in the file system 2500 in step S513 and step S518 to reflect the difference in the file, but it is not imperative that the difference is reflected. For example, the file server 2000 may only transfer the difference block and store the transferred difference block in the difference storage file system 2600 with the synchronous processing at a certain point in time without reflecting the difference in the file, and transfer the difference block and reflect the difference in the file in the synchronous processing at the other points in time.

Embodiment 2

Embodiment 2 is now explained. The differences with Embodiment 1 are mainly explained, and the explanation of points that are common with Embodiment 1 is omitted or simplified.

Figure 16:
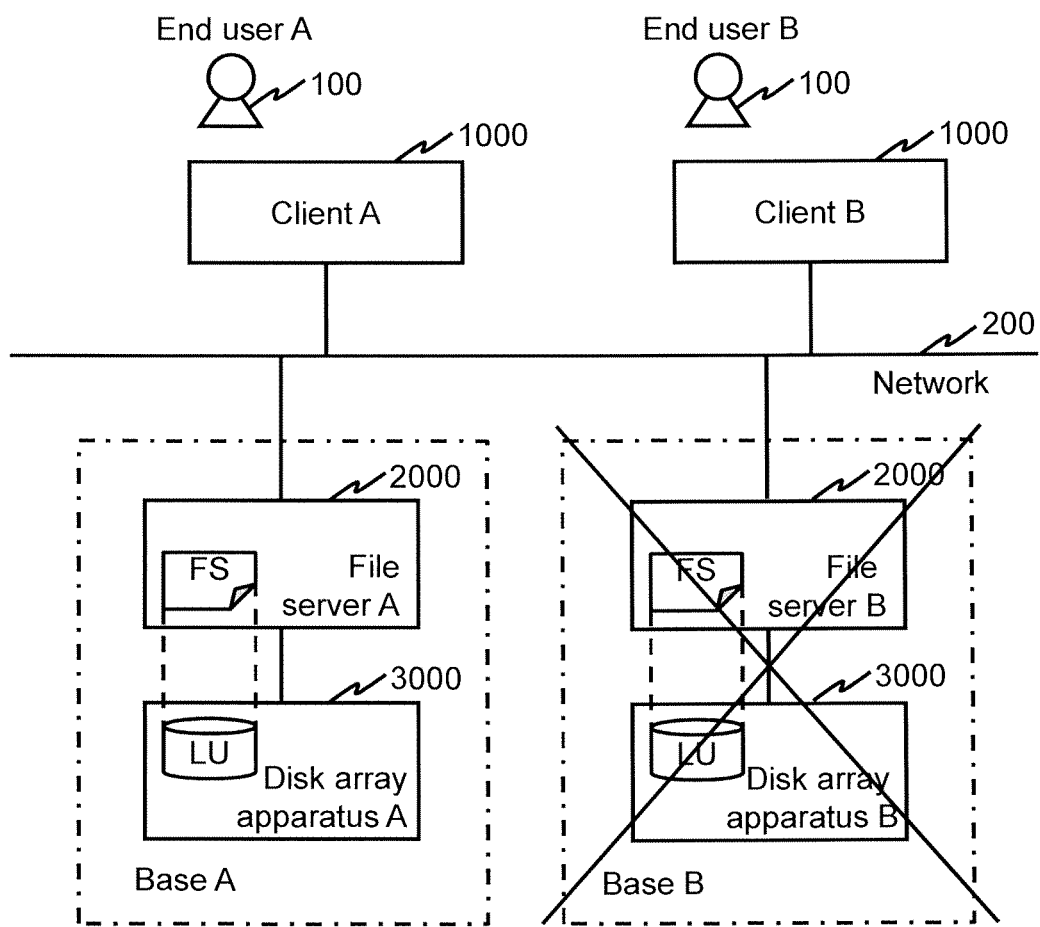
FIG. 16 is a configuration diagram showing an example of the computer system according to Embodiment 2.

FIG. 16 is a configuration diagram showing an example of the computer system according to Embodiment 2.

The configuration of the computer system according to this embodiment is substantially the same as the computer system according to Embodiment 1. In this embodiment, let it be assumed that a failure occurs in the file server B. As the modes of failure, there are, for example, a connection failure between the client A or the client B and the file server B, an internal failure of the file server B, a connection failure between the file server B and the disk array apparatus B, an internal failure of the disk array apparatus B, and so on. When the file server A detects the occurrence of a failure in the file server B, the file server A switches to the processing upon the occurrence of a failure shown in FIG. 17 to FIG. 21 described later, and continues its operation. Note that, as the method of the file server A and the file server B mutually monitoring the occurrence of a failure, this embodiment anticipates the mutual life-or-death monitoring; for instance, monitoring based on a heartbeat, by the file server A and the file server B via the network 200. However, without limitation to the foregoing method, other methods may be used so long as the file server A and the file server B can monitor the occurrence of a failure each other.

Figure 17:
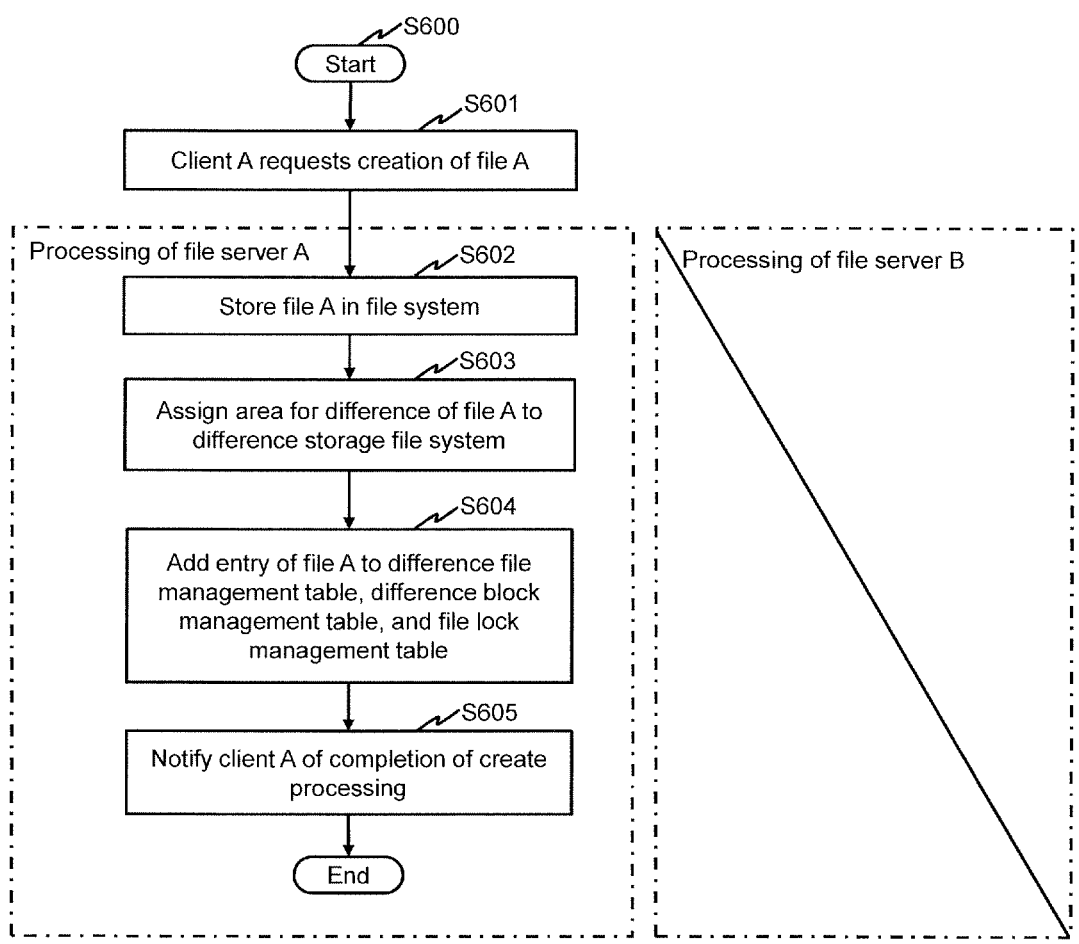
FIG. 17 is a flowchart of the file create processing according to Embodiment 2.

FIG. 17 is a flowchart of the file create processing according to Embodiment 2. This diagram show a case where the client A requests the creation of the file A to the file server A when a failure occurs in the file server B.

Foremost, the client A operated by the end user 100 issues a create request of the file A to the file server A, and sends the file A together with the create request (step S601).

Subsequently, the file operation control program 2410 of the file server A stores, in the file system 2500 of the file server A, the file A that was received together with the create request in step S601 (step S602).

Subsequently, the file operation control program 2410 of the file server A assigns, to the difference storage file system 2600 of the file server A, the area for storing the difference of the file A stored in the file system 2500 in step S602 (step S603).

Subsequently, the file operation control program 2410 of the file server A adds entry related to the file A to the difference file management table T100A. Specifically, the file operation control program 2410 of the file server A adds entry in which "file A" is stored in the file name T101 and "Null" is stored in the difference file hold flag T102. Moreover, the file operation control program 2410 of the file server A adds entries related to the file A to the difference block management table T200A. Specifically, the file operation control program 2410 of the file server A adds entries in which a unique numerical value is stored in the difference ID T201, "file A" is stored in the file name T202, a path to the storage area of the file block configuring the file A in the file system 2500 of the file server A is stored in the file block path T203, a path to the storage area of the difference block of the file A in the difference storage file system 2600 of the file server A is stored in the difference block path T204, and "Null" is stored in the difference block hold flag T205. The addition of entries to the difference block management table T200A is performed to all file blocks configuring the file A. Moreover, the file operation control program 2410 of the file server A adds entry related to the file A to the file lock management table T300A. Specifically, the file operation control program 2410 of the file server A adds entry in which "file A" is stored in the file name T301, "N" is stored in the lock flag T302, and "Null" is stored in the lock user T303 (step S604).

After completing the processing of step S604, the file operation control program 2410 of the file server A notifies the client A of the completion of the creation of the file A (step S605), and ends the file create processing.

Figure 18:
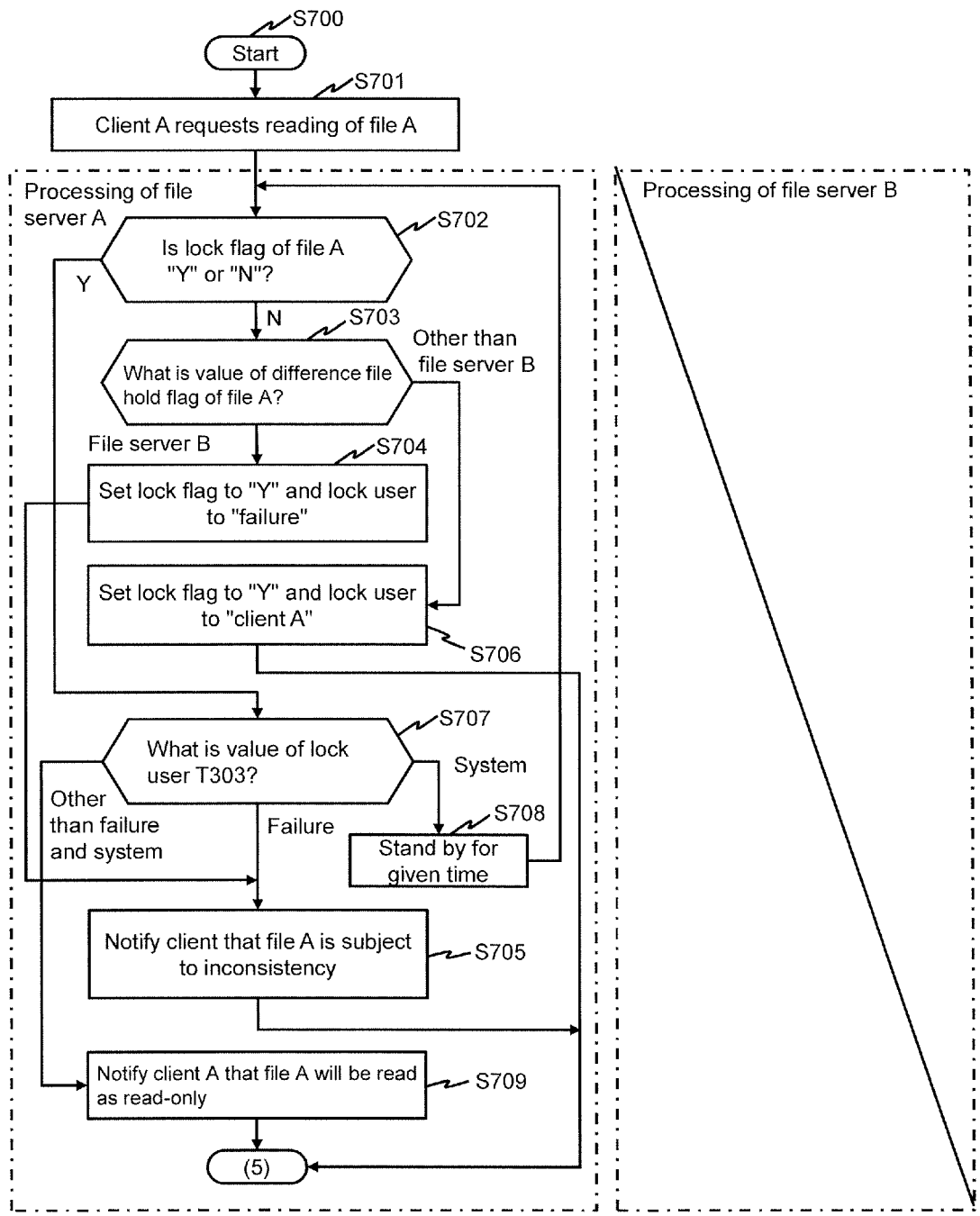
FIG. 18 is a first flowchart of the file read processing according to Embodiment 2.
Figure 19:
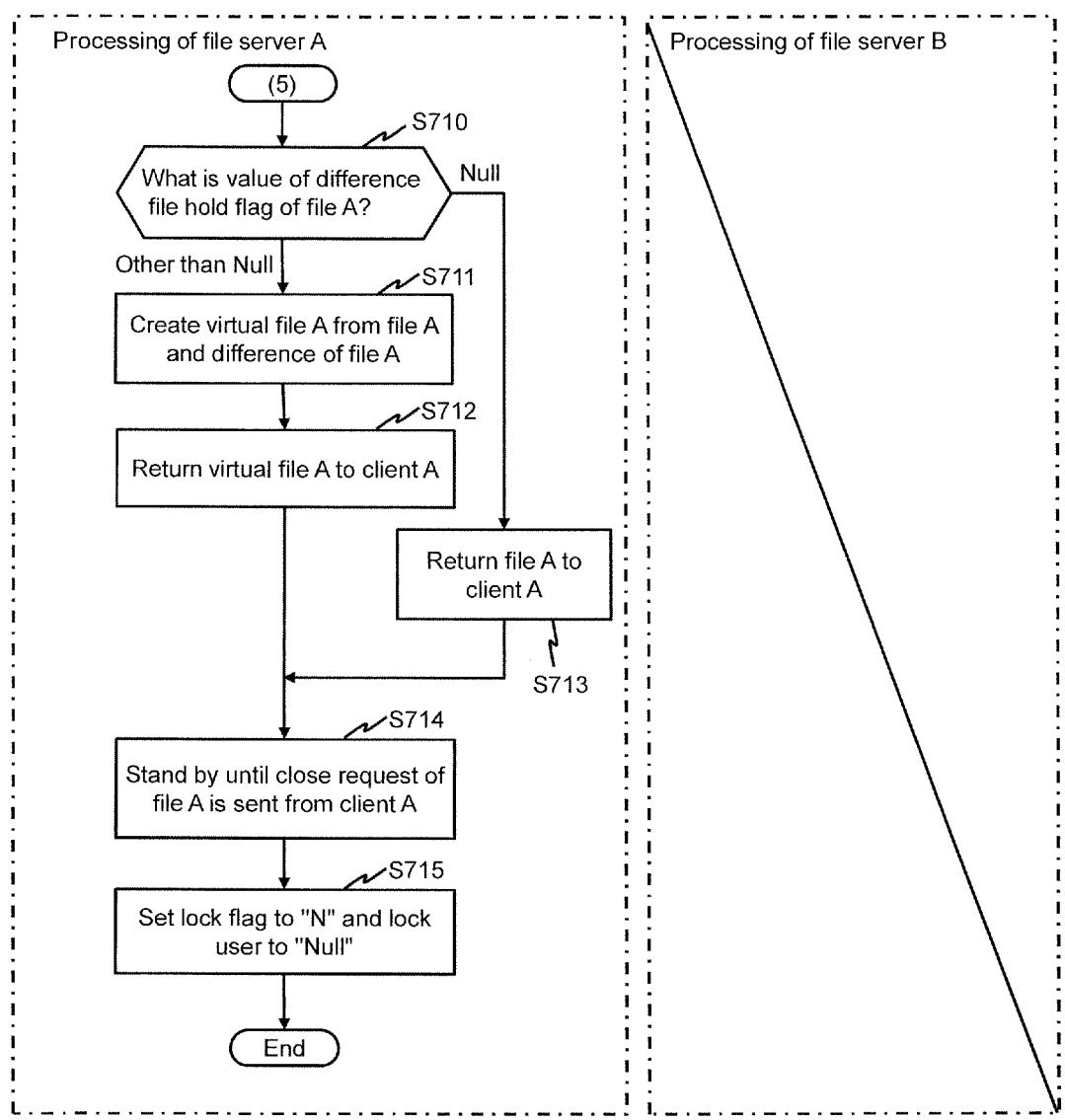
FIG. 19 is a second flowchart of the file read processing according to Embodiment 2.

FIG. 18 is a first flowchart of the file read processing according to Embodiment 2. FIG. 19 is a second flowchart of the file read processing according to Embodiment 2. The two flowcharts shown in FIG. 18 and FIG. 19 show the overall file read processing, and (5) in FIG. 18 and FIG. 19 shows the connection of the flowcharts in the respective diagrams, and the portion of the same indication in the drawings show that the processing is continuous. FIG. 18 and FIG. 19 show a case where the client A requests the reading of the file A to the file server A when a failure occurs in the file server B.

In FIG. 18, foremost, the client A operated by the end user 100 issues a read request of the file A to the file server A (step S701).

Subsequently, the file operation control program 2410 of the file server A refers to the file lock management table T300A, determines whether the lock flag T302 of the entry in which the file name T301 is "file A" is "Y" or "N", and then branches the processing (step S702). Specifically, the file operation control program 2410 of the file server A advances the processing to step S703 when the lock flag T302 is "N" (step S702: N), and advances the processing to step S707 when the lock flag T302 is "Y" (step S702: Y).

The processing that is executed when the lock flag T302 is "N" in the determination in step S702 (step S702: N) is described below. The file operation control program 2410 of the file server A refers to the difference file management table T100A, determines the value of the difference file hold flag T102 of the entry in which the file name T101 is "file A", and then branches the processing (step S703). Specifically, the file operation control program 2410 of the file server A advances the processing to step S704 when the difference file hold flag T102 is "file server B" (step S703: file server B), and advances the processing to step S706 when the difference file hold flag T102 is other than "file server B" (step S703: other than file server B).

The processing that is executed when the difference file hold flag T102 is "file server B" in the determination in step S703 (step S703: file server B) is described below. The file operation control program 2410 of the file server A sets the lock flag T302 of the entry related to the file A in the file lock management table T300A to "Y", and sets the lock user T303 to "failure" (step S704). Thereafter, the file operation control program 2410 of the file server A advances the processing to step S705.

The processing that is executed when the difference file hold flag T102 is other than "file server B" in the determination in step S703 (step S703: other than file server B) is described below. The file operation control program 2410 of the file server A sets the lock flag T302 of the entry related to the file A in the file lock management table T300A to "Y", and sets the lock user T303 to "client A" (step S706). Thereafter, the file operation control program 2410 of the file server A advances the processing to step S710 of FIG. 19.

The processing that is executed when the lock flag T302 is "Y" in the determination in step S702 (step S702: Y) is described below. The file operation control program 2410 of the file server A refers to the file lock management table T300A, determines the value of the lock user T303 of the entry in which the file name T301 is "file A", and then branches the processing (step S707). Specifically, the file operation control program 2410 of the file server A advances the processing to step S708 when the lock user T303 is "system" (step S707: system), advances the processing to step S705 when the lock user T303 is "failure" (step S707: failure), and advances the processing to step S709 when the lock user T303 is other than "failure" and "system" (step S707: other than failure and system).

The processing that is executed when the lock user T303 is "system" in the determination in step S707 (step S707: system) is described below. The file operation control program 2410 of the file server A waits for a given time (step S708), and thereafter advances the processing to step S702.

The processing that is executed when the lock user T303 is other than "failure" and "system" in the determination in step S707 (step S707: other than failure and system) is described below. The file operation control program 2410 of the file server A notifies the client A that the file A has been locked by another user and will be read only (step S709). Thereafter, the file operation control program 2410 of the file server A advances the processing to step S710 of FIG. 19.

In step S705, the file operation control program 2410 of the file server A notifies the client A that the file A is temporarily read only since there is an inconsistency in the file A and there is a possibility that the file A has not been updated. Thereafter, the file operation control program 2410 of the file server A advances the processing to step S710 of FIG. 19.

In step S710 of FIG. 19, the file operation control program 2410 of the file server A refers to the difference file management table T100A, determines the value of the difference file hold flag T102 of the entry in which the file name T101 is "file A", and then branches the processing (step S710). Specifically, the file operation control program 2410 of the file server A advances the processing to step S713 when the difference file hold flag T102 is "Null" (step S710: Null), and advances the processing to step S711 when the difference file hold flag T102 is other than "Null" (step S710: other than Null).

The processing that is executed when the difference file hold flag T102 is other than "Null" in the determination in step S710 (step S710: other than Null) is described below. The file operation control program 2410 of the file server A refers to the respective difference block hold flags T205 of the entry in which the file name T202 is "file A" in the difference block management table T200A, and identifies whether there is a difference block regarding the respective file blocks configuring the file A. In addition, regarding the file block in the difference block hold flag T205 is "Null"; that is, regarding the file block without a difference block, the file operation control program 2410 of the file server A acquires that file block from the area that is identified by the path information shown with the file block path T203 in the file system 2500 of the file server A. Meanwhile, regarding the file block in which the difference block hold flag T205 is other than "Null"; that is, regarding the file block with a difference block, the file operation control program 2410 of the file server A acquires the difference block of that file block from the area that is identified by the path information shown with the difference block path T204 in the difference storage file system 2600 of the file server A. Thereafter, the file operation control program 2410 of the file server A creates a virtual file A; that is, the file A with the latest difference reflected therein, in the memory 2400 based on the acquired file block and the difference block (step S711).

Subsequently, the file operation control program 2410 of the file server A sends the virtual file A that was created in step S711 to the client A (step S712), and advances the processing to step S714.

The processing that is executed when the difference file hold flag T102 is "Null" in the determination in step S710 (step S710: Null) is described below. The file operation control program 2410 of the file server A acquires the path information for identifying the storage area of the respective file blocks configuring the file A from the respective file block paths T203 of the entries in which the file name T202 is "file A" in the difference block management table T200A. In addition, the file operation control program 2410 of the file server A acquires the respective file blocks configuring the file A from the area that was identified by the acquired path information in the file system 2500 of the file server A. Thereafter, the file operation control program 2410 of the file server A creates the file A in the memory 2400 based on the acquired file blocks. Thereafter, the file operation control program

2410 of the file server A sends the created file A to the client A (step S713), and advances the processing to step S714.

In step S714, the file operation control program 2410 of the file server A waits until a close request of the file A from the client A is received.

Upon receiving a close request of the file A from the client A, the file operation control program 2410 of the file server A sets the lock flag of the entry in which the file name T301 is "file A" in the file lock management table T300A to "N", and sets the lock user to "Null" (step S715). Thereafter, the file operation control program 2410 of the file server A ends the file read processing.

Figure 20:
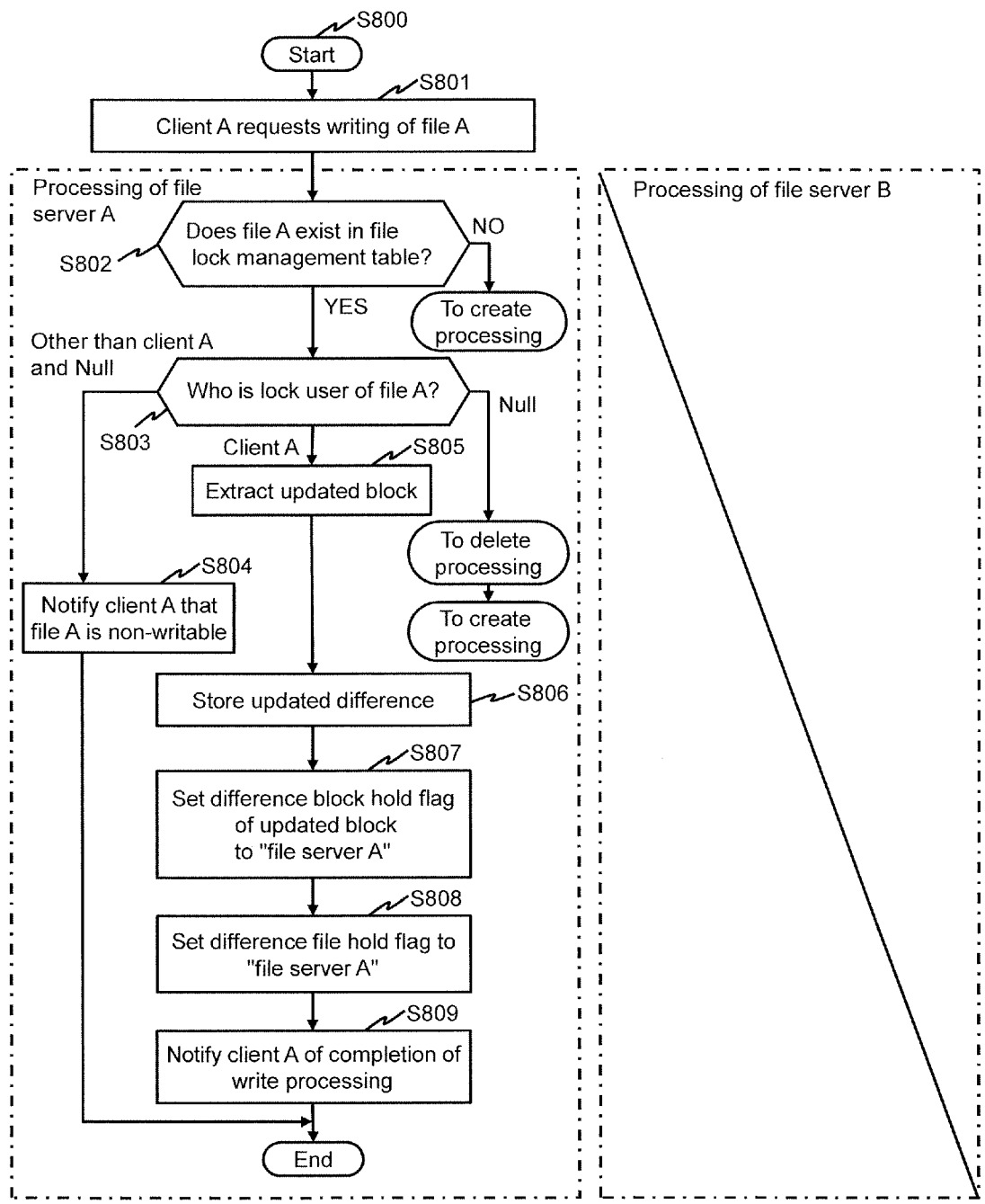
FIG. 20 is a flowchart of the file write processing according to Embodiment 2.

FIG. 20 is a flowchart of the file write processing according to Embodiment 2. This diagram shows a case where the client A requests the writing of the file A to the file server A when a failure occurs in the file server B. Note that, let it be assumed that the file read processing of FIG. 18 and FIG. 19 has been performed prior to the performance of the file write processing of this diagram.

Foremost, the client A operated by the end user 100 issues a write request of the file A to the file server A, and sends the updated file A together with the write request (step S801).

Subsequently, the file operation control program 2410 of the file server A refers to the file lock management table T300A, determines whether there is an entry in which the file name T301 is "file A", and then branches the processing (step S802). Specifically, the file operation control program 2410 of the file server A advances the processing to step S803 when there is an entry in which the file name T301 is "file A" (step S802: YES), and performs the file create processing (refer to FIG. 17) of the file A when there is no entry in which the file name T301 is "file A" (step S802: NO).

The processing that is executed when there is an entry in which the file name T301 is "file A" in the determination in step S802 (step S802: YES) is described below. The file operation control program 2410 of the file server A refers to the file lock management table T300A, determines the user shown with the lock user T303 of the entry in which the file name T301 is "file A", and then branches the processing (step S803). Specifically, the file operation control program 2410 of the file server A advances the processing to step S805 when the lock user T303 is "client A" (step S803: client A), and determines that this is processing for overwriting a separate file of the same name when the lock user T303 is "Null" (step S803: Null), performs the file delete processing of the file A (refer to FIG. 21), and thereafter performs the file create processing of the file A (refer to FIG. 17). Moreover, the file operation control program 2410 of the file server A advances the processing to step S804 when the lock user T303 is neither "client A" nor "Null" (step S803: other than client A and Null).

The processing that is executed when the lock user T303 is neither "client A" nor "Null" in the determining step S803 (step S803: other than client A and Null) is described below. The file operation control program 2410 of the file server A notifies the client A that the file A has been locked by another user and is therefore read only and writing is not possible (step S804), and thereby ends the file write processing.

The processing that is executed when the lock user T303 is "client A" in the determination in step S803 (step S803: client A) is described below. The file operation control program 2410 of the file server A compares the respective file blocks configuring the file A received from the client A in step S801, and the respective file blocks configuring the file A sent to the client A in step S712 or step S713 of FIG. 19; that is, the respective file blocks configuring the file A sent to the client in the file read processing that was performed prior to the file write processing, and extracts the updated file blocks (updated blocks) of the file A (step S805).

Subsequently, the file operation control program 2410 of the file server A acquires, from the difference block management table T200A, the path information shown with the difference block path T204 of the entry related to the updated blocks. In addition, the file operation control program 2410 of the file server A stores, as the difference blocks, the updated data of the updated books in the area that is identified by the identified path information in the difference storage file system 2600 of the file server A (step S806).

Subsequently, the file operation control program 2410 of the file server A sets the difference block hold flag T205 of the entry related to the updated blocks in the difference block management table T200A to "file server A" (step S807).

Subsequently, the file operation control program 2410 of the file server A sets the difference file hold flag T102 of the entry in which the file name T101 is "file A" in the difference file management table T100A to "file server A" (step S808).

Thereafter, the file operation control program 2410 of the file server A notifies the client A of the completion of writing of the file A (step S809), and thereby ends the file write processing.

Figure 21:
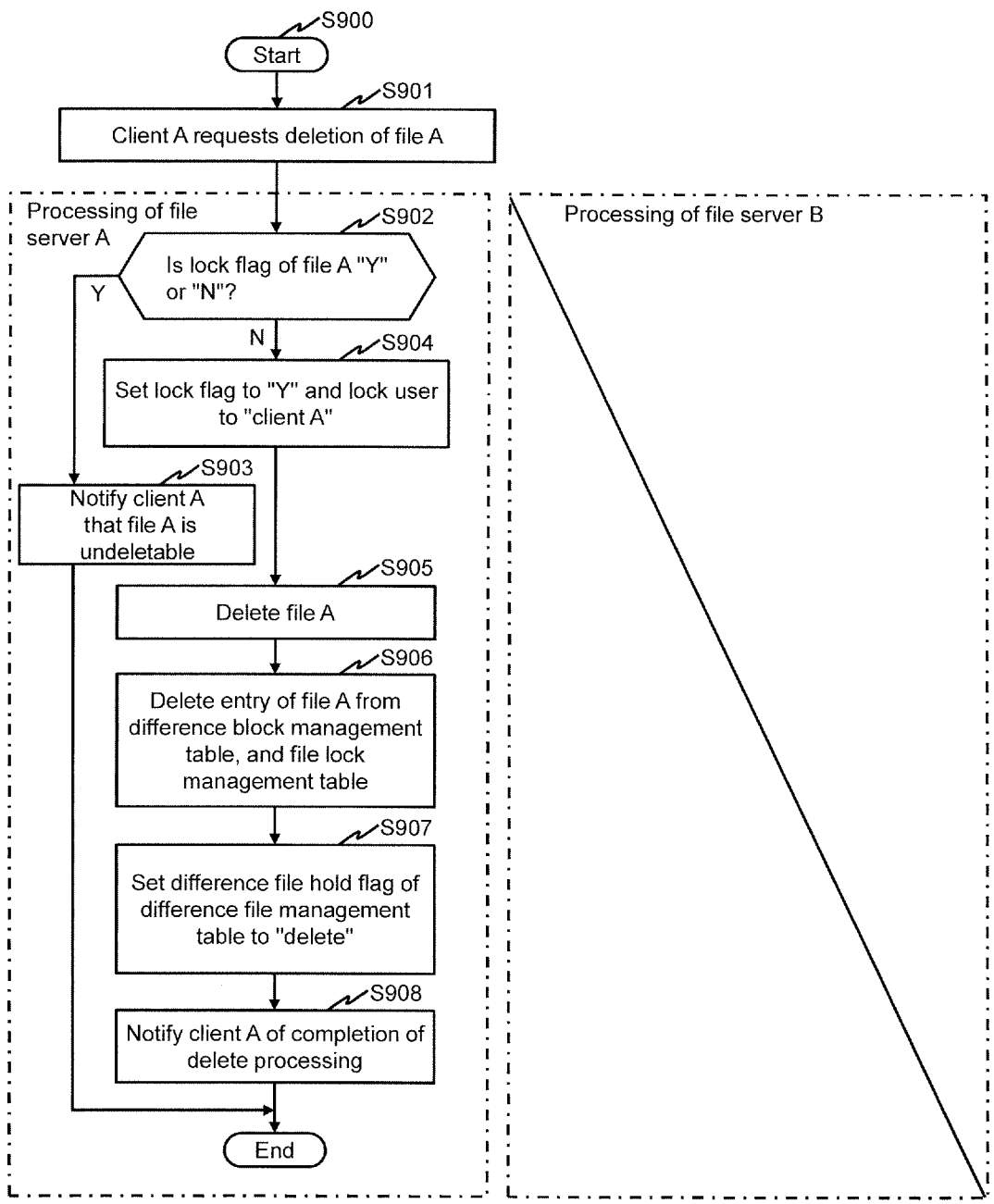
FIG. 21 is a flowchart of the file delete processing according to Embodiment 2.

FIG. 21 is a flowchart of the file delete processing according to Embodiment 2. This diagram shows a case where the client A requests the deletion of the file A to the file server A when a failure occurs in the file server B.

Foremost, the client A operated by the end user 100 issues a delete request of the file A to the file server A (step S901).

Subsequently, the file operation control program 2410 of the file server A refers to file lock management table T300A, determines whether the lock flag T302 of the entry in which the file name T301 is "file A" is "Y" or "N", and then branches the processing (step S902). Specifically, the file operation control program 2410 of the file server A advances the processing to step S903 when the lock flag T302 is "Y" (step S902: Y), and advances the processing to step S904 when the lock flag T302 is "N" (step S902: N).

The processing that is executed when the lock flag T302 is "Y" in the determination in step S902 (step S902: Y) is described below. The file operation control program 2410 of the file server A notifies the client A that the file A has been locked by another user and is in a read only state and cannot be deleted (step S903), and thereby ends the file delete processing.

The processing that is executed when the lock flag T302 is "N" in the determination in step S902 (step S902: N) is described below. The file operation control program 2410 of the file server A sets the lock flag T302 of the entry in which the file name T301 is "file A" in the file lock management table T300A to "Y", and sets the lock user T303 to "client A" (step S904).

Subsequently, the file operation control program 2410 of the file server A deletes all file blocks stored in the area that is identified by the path information shown with the file block path T203 of the entry in which the file name T202 is "file A" in the difference block management table T200A; that is, all file blocks configuring the file A stored in the file system 2500 of the file server A. Moreover, the file operation control program 2410 of the file server A deletes all difference blocks stored in the area that is identified by the path information shown with the difference block path T204 of the entry in which the file name T202 is "file A" in the difference block management table T200A; that is, all difference blocks of the file A stored in the difference storage file system 2600 of the file server A (step S905).

Subsequently, the file operation control program 2410 of the file server A deletes all entries related to the file A registered in the difference block management table T200A and the file lock management table T300A, respectively (step S906).

Subsequently, the file operation control program 2410 of the file server A sets the difference file hold flag T102 of the entry in which the file name T101 is "file A" in the difference file management table T100A to "Delete" (step S907). The "Delete" of the file hold flag T102 shows that the file has been deleted while a failure had occurred in another file server 2000 (file server B in this embodiment) that is forming the remote copy pair.

Thereafter, the file operation control program 2410 of the file server A notifies the client A of the completion of deletion of the file A (step S908), and thereby ends the file delete processing.

Figure 22:
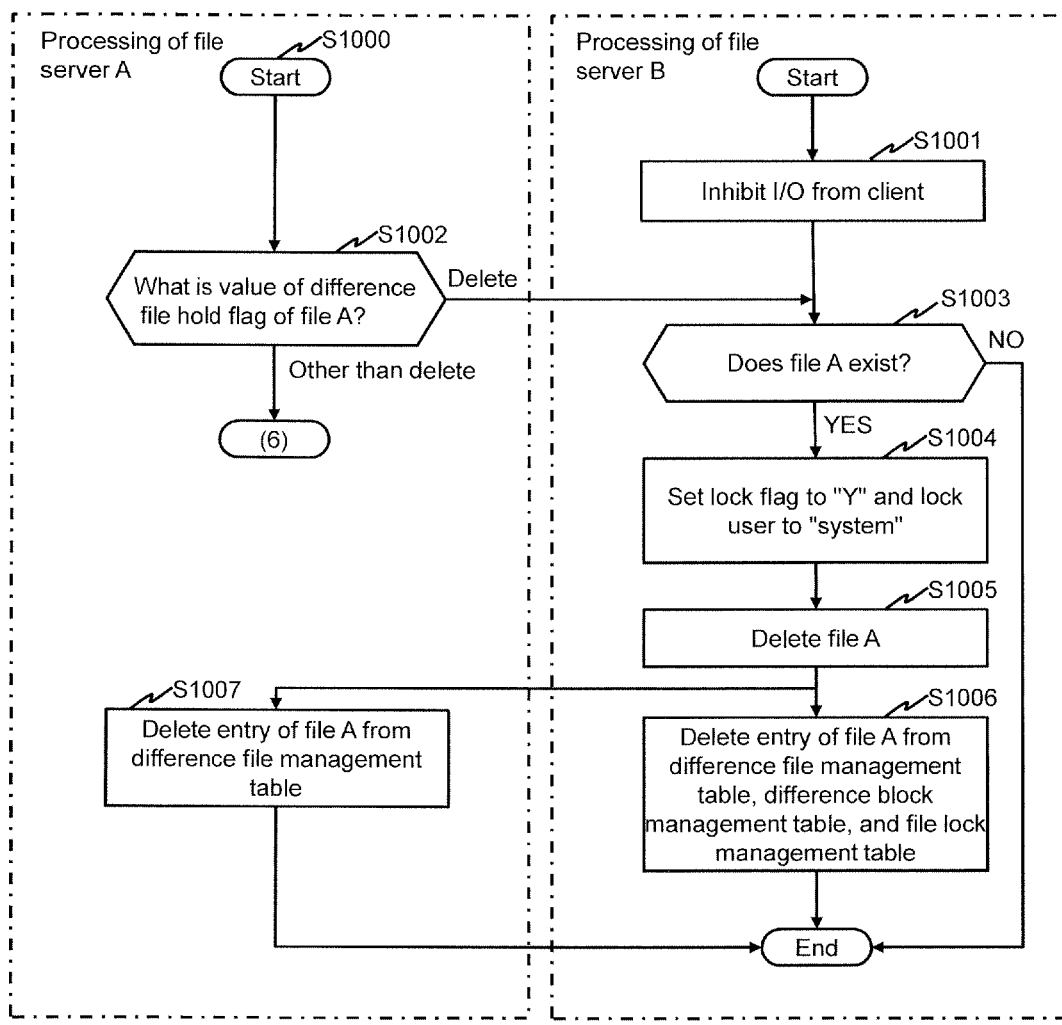
FIG. 22 is a first flowchart of the consistency confirmation processing according to Embodiment 2.
Figure 23:
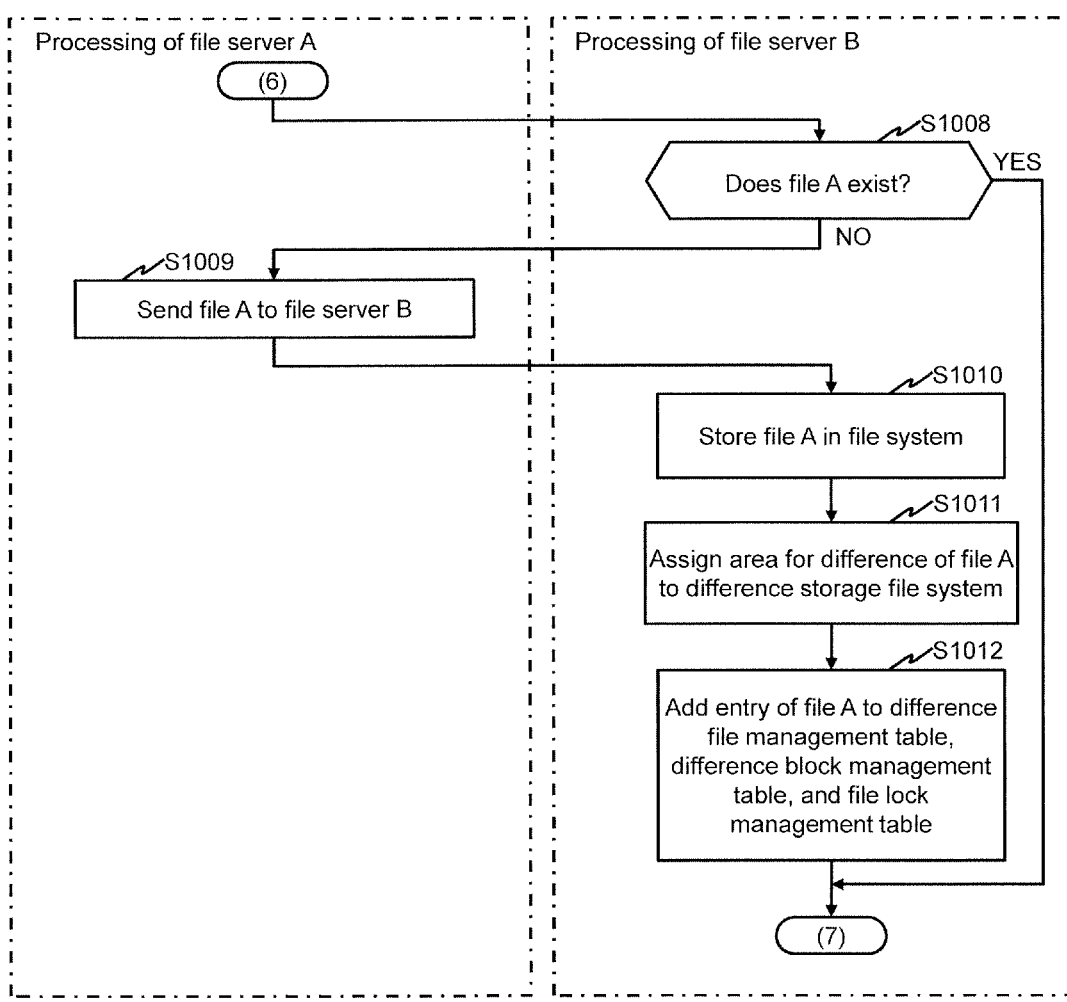
FIG. 23 is a second flowchart of the consistency confirmation processing according to Embodiment 2.
Figure 24:
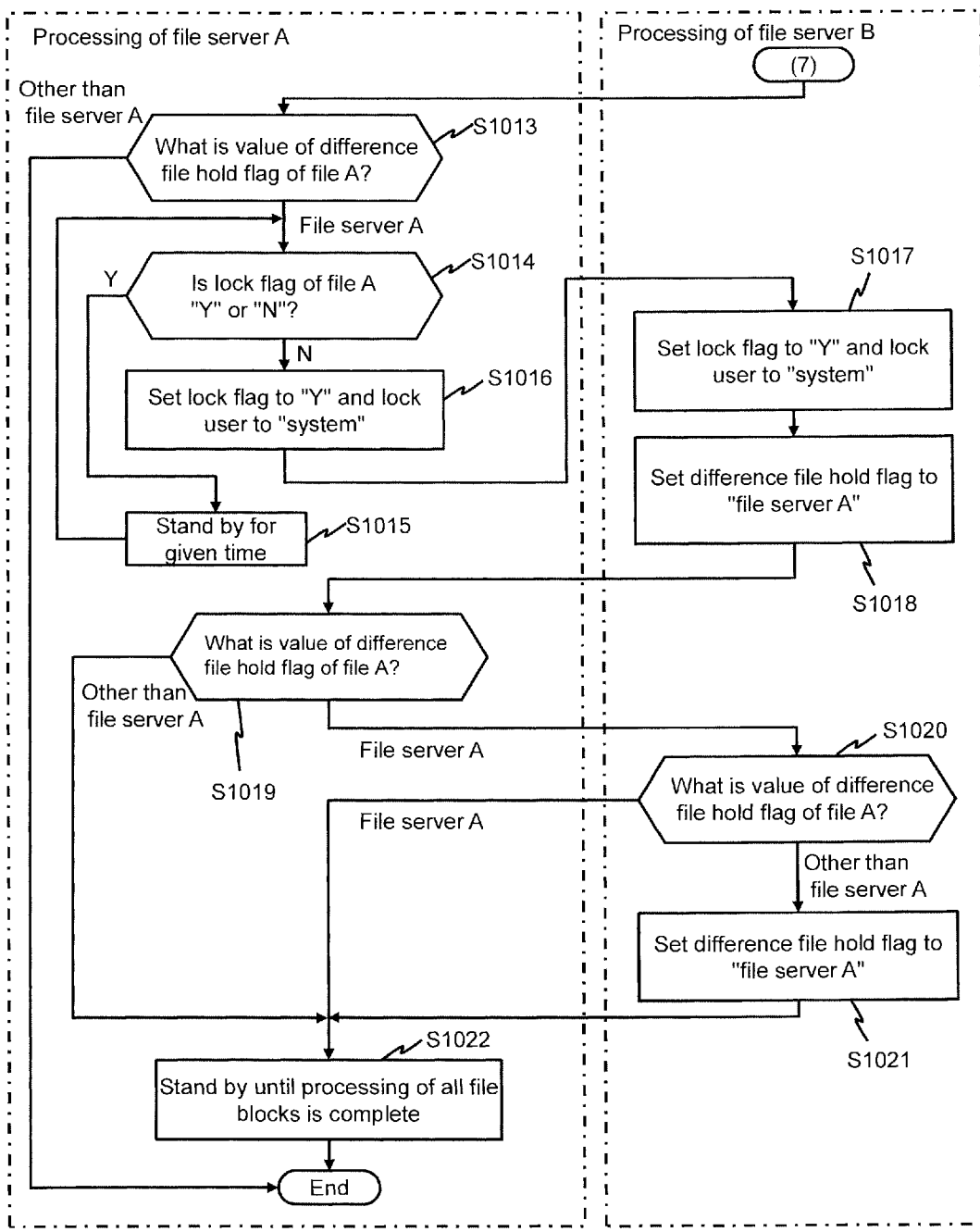
FIG. 24 is a third flowchart of the consistency confirmation processing according to Embodiment 2.

FIG. 22 is a first flowchart of the consistency confirmation processing according to Embodiment 2. FIG. 23 is a second flowchart of the consistency confirmation processing according to Embodiment 2. FIG. 24 is a third flowchart of the consistency confirmation processing according to Embodiment 2. The three flowcharts shown in FIG. 22 to FIG. 24 show the overall consistency confirmation processing, and (6) and (7) in this diagram show the connection of the flowcharts of the respective diagrams, and the portion of the same indication in the drawings show that the processing is continuous. The consistency confirmation processing is the processing that is performed when the file server B recovers from a failure, and is the processing of achieving synchronization of the difference management tables between the file server A and the file server B. When one of the file servers recovers from a failure, the contents of the difference management table will be inconsistent in the file server that recovered from a failure and the file server that continued running under a single system. However, as a result of performing the consistency confirmation processing, the difference management tables can be made to have the same contents in the operation based on both systems. FIG. 22 to FIG. 24 show an example where the file A is stored in the file system 2500.

In FIG. 22, foremost, after the file server B recovers from a failure, the difference synchronization control program 2420 of the file server B inhibits the I/O request from the client 1000 until the foregoing consistency confirmation processing is complete (step S1001).

Meanwhile, the difference synchronization control program 2420 of the file server A refers to the difference file management table T100A, determines the value of the difference file hold flag T102 of the entry in which the file name T101 is "file A", and then branches the processing (step S1002). Specifically, the difference synchronization control program 2420 of the file server A notifies the file server B that the file A was deleted during the occurrence of a failure when the difference file hold flag T102 is "Delete" (step S1002: Delete), and notifies the file server B that the confirmation of consistency will be started when the difference file hold flag T102 is other than "Delete" (step S1002: other than Delete).

The difference synchronization control program 2420 of the file server B that received the notification from the file server A to the effect that the file A was deleted during the occurrence of a failure advances the processing to step S1003. Meanwhile, the difference synchronization control program 2420 of the file server B that received the notification from the file server A to the effect that the confirmation of consistency will be started advances the processing to step S1008 of FIG. 23.

In step S1003, the difference synchronization control program 2420 of the file server B determines whether the file A exists, and then branches the processing. Specifically, the difference synchronization control program 2420 of the file server B determines whether the file A exists by determining whether there is an entry related to the file A in the difference file management table T100B, the difference block management table T200B and the file lock management table T300B. The difference synchronization control program 2420 of the file server B advances the processing to step S1004 when the file A exists (step S1003: YES), and ends the consistency confirmation processing when the file A does not exist (step S1003: NO).

The processing that is executed when the file A exists in the determination in step S1003 (step S1003: YES) is described below. The difference synchronization control program 2420 of the file server B sets the lock flag T301 of the entry related to the file A in the file lock management table T300B to "Y", and sets the lock user T302 to "system" (step S1004). Note that, since the I/O request from the client 1000 to the file server B is being inhibited, file A is not locked.

Subsequently, the difference synchronization control program 2420 of the file server B deletes all file blocks stored in the area that is identified by the path information shown with the file block path T203 of the entry in which the file name T202 is "file A" in the difference block management table T200B; that is, all file blocks configuring the file A stored in the file system 2500 of the file server B. Moreover, the difference synchronization control program 2420 of the file server B deletes all difference blocks stored in the area that is identified by the path information shown with the difference block path T204 of the entry in which the file name T202 is "file A" in the difference block management table T200B; that is, all difference blocks of the file A stored in the difference storage file system 2600 of the file server B, and notifies the file server A of the completion of deletion of the file A (step S1005).

Subsequently, the difference synchronization control program 2420 of the file server B deletes all entries related to the file A registered in the difference file management table T100B, the difference block management table T200B and the file lock management table T300B (step S1006). Thereafter, the difference synchronization control program 2420 of the file server B ends the consistency confirmation processing.

Meanwhile, the difference synchronization control program 2420 of the file server A that received the notification from the file server B regarding the completion of deletion of the file A, in parallel with step S1006, deletes the entry related to the file A registered in the difference file management table T100A (step S1007). Thereafter, the difference synchronization control program 2420 of the file server A ends the consistency confirmation processing.

In step S1008 of FIG. 23, the difference synchronization control program 2420 of the file server B determines the existence of the file A, and then branches the processing. Specifically, the difference synchronization control program 2420 of the file server B notifies the file server A of the existence of the file A when the file A exists (step S1008: YES), and notifies the difference synchronization control program 2420 of the file server A of the non-existence of the file A when the file A does not exist (step S1008: NO).

The difference synchronization control program 2420 of the file server A that received the notification from the file server B to the effect that the file A exists advances the processing to step S1013 of FIG. 24. Meanwhile, the difference synchronization control program 2420 of the file server A that received the notification from the file server B to the effect that the file A does not exists advances the processing to step S1009.

In step S1009, the difference synchronization control program 2420 of the file server A acquires the path information for identifying the storage area of the respective file blocks configuring the file A from the respective file block paths T203 of the entries in which the file name T202 is "file A" in the difference block management table T200A. In addition, the difference synchronization control program 2420 of the file server A acquires the respective files blocks configuring the file A from the area that was identified by the acquired path information in the file system 2500 of the file server A. Thereafter, the difference synchronization control program 2420 of the file server A creates the file A in the memory 2400 based on the acquired file blocks. Thereafter, the difference synchronization control program 2420 of the file server A sends the created file A to the file server B (step S1009).

The difference synchronization control program 2420 of the file server B that received the file A from the file server A stores the received file A in the file system 2500 of the file server B (step S1010).

Subsequently, the difference synchronization control program 2420 of the file server B assigns, to the difference storage file system 2600 of the file server B, the area for storing the difference of the file A that was stored in the file system 2500 in step S1010 (step S1011).

Subsequently, the difference synchronization control program 2420 of the file server B adds entries related to the file A to the difference file management table T100B. Specifically, the difference synchronization control program 2420 of the file server B adds entries in which "file A" is stored in the file name T101 and "Null" is stored in the difference file hold flag T102. Moreover, the difference synchronization control program 2420 of the file server B adds entries related to the file A to the difference block management table T200B. Specifically, the difference synchronization control program 2420 of the file server B adds entries in which a unique numerical value is stored in the difference ID T201, "file A" is stored in the file name T202, a path to the storage area of the file blocks configuring the file A in the file system 2500 of the file server B is stored in the file block path T203, a path to the storage area of the difference block of the file A in the difference storage file system 2600 of the file server B is stored in the difference block path T204, and "Null" is stored in the difference block hold flag T205. The addition of entries to the difference block management table T200B is performed to all file blocks configuring the file A. Moreover, the difference synchronization control program 2420 of the file server B adds entries related to the file A to the file lock management table T300B. Specifically, the difference synchronization control program 2420 of the file server B newly adds entries in which "file A" is stored in the file name T301, "N" is stored in the lock flag T302, and "Null" is stored in the lock user T303 (step S1012). Thereafter, the difference synchronization control program 2420 of the file server B notifies the file server A of the completion of registration of the file A.

The difference synchronization control program 2420 of the file server A that received the notification from the file server B regarding the completion of registration of the file A advances the processing to step S1013 of FIG. 24, refers to the difference file management table T100A, determines the value of the difference file hold flag T102 of the entry in which the file name T101 is "file A", and then branches the processing. Specifically, the difference synchronization control program 2420 of the file server A advances the processing to step S1014 when the difference file hold flag T102 is "file server A" (step S1013: file server A), and ends the consistency confirmation processing when the difference file hold flag T102 is other than "file server A" (step S1013: other than file server A).

The processing that is executed when the difference file hold flag T102 is "file server A" in the determination in step S1013 (step S1013: file server A) is described below. The difference synchronization control program 2420 of the file server A refers to the file lock management table T300A, determines whether the lock flag T302 of the entry in which the file name T301 is "file A" is "Y" or "N", and then branches the processing (step S1014). Specifically, the difference synchronization control program 2420 of the file server A advances the processing to step S1015 when the lock flag T302 is "Y" (step S1014: Y), and advances the processing to step S1016 when the lock flag T302 is "N" (step S1014: N).

The processing that is executed when the lock flag T302 is "Y" in the determination in step S1014 (step S1014: Y) is described below. The difference synchronization control program 2420 of the file server A waits for a given time (step S1015), and thereafter advances the processing to step S1014.

The processing that is executed when the lock flag T302 is "N" in the determination in step S1014 (step S1014: N) is described below. The difference synchronization control program 2420 of the file server A sets the lock flag T302 of the entry in which the file name T301 is "file A" in the file lock management table T300A to "Y", sets the lock user T303 to "system", and notifies the file server B that the lock of the file A has been acquired (step S1016).

The difference synchronization control program 2420 of the file server B that received the notification from the file server A to the effect that the lock of the file A has been acquired sets the lock flag T302 of the entry in which the file name T301 is "file A" in the file lock management table T300B to "Y", and sets the lock user T303 to "system" (step S1017).

Subsequently, the difference synchronization control program 2420 of the file server B sets the difference file hold flag T102 of the entry in which the file name T101 is "file A" in the difference file management table T100A to "file server A", and notifies the file server A that the lock of the file A has been acquired (step S1018).

The difference synchronization control program 2420 of the file server A that received the notification from the file server B to the effect that the lock of the file A has been acquired performs the processing on the file server A side among the processing of step S1019 to step S1021 to the respective file blocks configuring the file A. Note that the processing of step S1019 to step S1021 may be performed to the respective file blocks successively or in parallel. Here, one file block to be processed among the file blocks configuring the file A is referred to as a "target file block" in the explanation of step S1019 to step S1021.

The difference synchronization control program 2420 of the file server A determines the value of the difference block hold flag T205 of the entry related to the target file block in the difference block management table T200A, and then branches the processing (step S1019). Specifically, the difference synchronization control program 2420 of the file server A notifies the file server B of the value of the difference ID T201 of the entry related to the target file block when the difference block hold flag T205 is "file server A" (step S1019: file server A), and advances the processing to step S1022 when the difference block hold flag T205 is other than "file server A" (step S1019: other than file server A).

The difference synchronization control program 2420 of the file server B that received the notification from the file server A regarding the value of the difference ID T201 of the entry related to the target file block advances the processing to step S1020, and identifies the entry related to the target file block in the difference block management table T200B based on the notified value of the difference ID T201. In addition, the difference synchronization control program 2420 of the file server B determines the value of the difference block hold flag T205 of the entry related to the target file block in the difference block management table T200B, and then branches the processing (step S1020). Specifically, the difference synchronization control program 2420 of the file server B notifies the file server A of the completion of confirmation of the consistency when the difference block hold flag T205 is "file server A" (step S1020: file server A), and advances the processing to step S1021 when the difference block hold flag T205 is other than "file server A" (step S1020: other than file server A).

The difference synchronization control program 2420 of the file server A that received the notification from the file server B regarding the completion of confirmation of the consistency advances the processing to step S1022.

The processing that is executed when the difference block hold flag T205 is other than "file server A" in the determination in step S1020 (step S1020: other than file server A) is described below. The difference synchronization control program 2420 of the file server B sets the difference block hold flag T205 of the entry related to the target file block in the difference block management table T200B to "file server A" (step S1021). Thereafter, the difference synchronization control program 2420 of the file server B notifies the file server A of the completion of confirmation of the consistency.

The difference synchronization control program 2420 of the file server A that received the notification from the file server B regarding the completion of confirmation of the consistency advances the processing to step S1022.

In step S1022, the difference synchronization control program 2420 of the file server A waits until the processing of step S1019 to step S1021 is completed regarding the respective file blocks configuring the file A, and, after the completion of processing, ends the consistency confirmation processing.

According to this embodiment, it is possible to realize a system configuration which enables the RW access to both the file server A and the file server B upon inhibiting the deterioration in the access performance of the RW access to the file server A and the file server B, which are a remote copy pair.

Note that the present invention is not limited to the embodiments explained above, and it goes without saying that the present invention may be modified variously to the extent that the modification does not deviate from the gist of this invention.

What is claimed is:

1. A file storage system, the storage system comprising:
a computer system comprising a first server including a first file system and a second server including a second file system, wherein:
the first server is configured to retain a first difference management table which shows whether a difference of a first file stored in the first file system and the second file system is stored in either the first file system or the second file system,
the second server is configured to retain a second difference management table which shows whether the difference of the first file is stored in either the first file system or the second file system,
upon receiving a write request for writing data in the first file, the first server is configured to store, in the first file system, difference data of the first file based on the write request, store, in the first difference management table, data showing that the difference data of the first file is stored in the first file system, and send, to the second server, a difference storage notification showing that the difference data of the first file has been stored in the first file system,
upon receiving the difference storage notification from the first server, the second server is configured to store, in the second difference management table, data showing that the difference of the first file is stored in the first file system,
the first file is stored in the first file system and the second file system, respectively, in file block units,
the difference data of the first file is stored in the first file system and the second file system, respectively, in the file block units of the first file,
the first difference management table and the second difference management table show, for each of the difference data in the file block units of the first file, the file system in which that difference data is stored, and
when the difference data of the first file is stored in the first file system upon recovery of the second server from a failure, the second server is configured to store, in the second difference management table, data showing that the difference data of the first file is stored in the first file system.

2. A file storage system according to claim 1,
wherein the second server is configured to:
acquire the difference data of the first file, which is not stored in the second file system, from the first server based on the second difference management table; and
store the acquired difference data of the first file in the second file system, and store, in the second difference management table, data showing that the difference data of the first file is stored in the first file system and the second file system.

3. A file storage system according to claim 1,
wherein, upon receiving a read request for reading data from the first file, the second server is configured to:
acquire the difference data of the first file, which is not stored in the second file system, from the first server based on the second difference management table; and
respond to the read request based on the first file and the difference data stored in the second file system.

4. A file storage system according to claim 1,
wherein, when an access request to the first file is not received for a given time or longer, the second server:
acquire the difference data of the first file, which is not stored in the second file system, from the first server based on the second difference management table; and
store the acquired difference data of the first file in the second file system, and store, in the second difference management table, data showing that the difference data of the first file is stored in the first file system and the second file system.

5. A file storage system according to claim 1,
wherein, when the difference of the first file is a given amount or more, the second server is configured to:

acquire the difference data of the first file, which is not stored in the second file system, from the first server based on the second difference management table; and store the acquired difference data of the first file in the second file system, and store, in the second difference management table, data showing that the difference data of the first file is stored in the first file system and the second file system.

6. A file storage system according to claim 1, wherein, upon receiving a deletion request for deleting the first file while a failure occurs in the second server, the first server is configured to delete the first file from the first file system and store data showing that the first file has been deleted, and when the second server recovers from the failure, the second server is configured to:

delete the first file from the second file system when the data showing that the first file has been deleted is stored in the first server, and acquire the first file from the first server and store the acquired first file in the second file system when the data showing that the first file has been deleted is not stored in the first server and the first file does not exist in the second file system.

7. A file storage method of a file storage system including a computer system comprising a first server including a first file system, and a second server including a second file system, further comprising:

upon receiving a write request for writing data in the first file:

storing, by the first server in the first file system, difference data of the first file based on the write request, storing, by the first server, in a first difference management table which shows whether a difference of a first file stored in the first file system and the second file system is stored in either the first file system or the second file system, data showing that the difference data of the first file is stored in the first file system, sending, from the first server to the second server, a difference storage notification showing that the difference data of the first file has been stored in the first file system, and upon receiving the difference storage notification from the first server, storing, by the second server, in a second difference management table which shows whether the difference of the first file is stored in either the first file system or the second file system, data showing that the difference of the first file is stored in the first file system, storing the first file in the first file system and the second file system, respectively, in file block units, storing the difference data of the first file in the first file system and the second file system, respectively, in the file block units of the first file, showing, in the first difference management table and the second difference management table, for each of the difference data in the file block units of the first file, the file system in which that difference data is stored, and when the difference data of the first file is stored in the first file system when the second server recovers from a failure, storing, by the second server, in the second difference management table, data showing that the difference data of the first file is stored in the first file system.

8. A file storage method according to claim 7, the file storage method further comprising:

acquiring, by the second server, the difference data of the first file, which is not stored in the second file system, from the first server based on the second difference management table; and storing, by the second server, the acquired difference data of the first file in the second file system, and storing, in the second difference management table, data showing that the difference data of the first file is stored in the first file system and the second file system.

9. A file storage method according to claim 7, further comprising:

upon receiving a read request for reading data from the first file, acquiring, by the second server, the difference data of the first file, which is not stored in the second file system, from the first server based on the second difference management table; and responding, by the second server, to the read request based on the first file and the difference data stored in the second file system.

10. A file storage method according to claim 7, further comprising:

when an access request to the first file is not received for a given time or longer, acquiring, by the second server, the difference data of the first file, which is not stored in the second file system, from the first server based on the second difference management table; and storing, by the second server, the acquired difference data of the first file in the second file system, and storing, in the second difference management table, data showing that the difference data of the first file is stored in the first file system and the second file system.

11. A file storage method according to claim 7, further comprising:

when the difference of the first file is a given amount or more, acquiring, by the second server, the difference data of the first file, which is not stored in the second file system, from the first server based on the second difference management table; and storing, by the second server, the acquired difference data of the first file in the second file system, and storing, in the second difference management table, data showing that the difference data of the first file is stored in the first file system and the second file system.

* * * * *